US012542872B2

(12) United States Patent
Lee et al.

(10) Patent No.: US 12,542,872 B2
(45) Date of Patent: Feb. 3, 2026

(54) ELECTRONIC DEVICE FOR SUPPORTING VARIOUS COMMUNICATIONS DURING VIDEO CALL, AND OPERATING METHOD THEREFOR

(71) Applicant: SAMSUNG ELECTRONICS CO., LTD., Suwon-si (KR)

(72) Inventors: Eunbin Lee, Suwon-si (KR); Chunhyoung Park, Suwon-si (KR); Giyoung Shin, Suwon-si (KR); Sanga Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 18/482,185

(22) Filed: Oct. 6, 2023

(65) Prior Publication Data

US 2024/0048668 A1 Feb. 8, 2024

Related U.S. Application Data

(63) Continuation of application No. PCT/KR2022/005079, filed on Apr. 8, 2022.

(30) Foreign Application Priority Data

Jun. 2, 2021 (KR) ........................ 10-2021-0071217

(51) Int. Cl.
*H04N 7/15* (2006.01)
*G06F 3/0486* (2013.01)
(Continued)

(52) U.S. Cl.
CPC ........... *H04N 7/157* (2013.01); *G06F 3/0486* (2013.01); *G06T 19/006* (2013.01); *G06T 19/20* (2013.01);
(Continued)

(58) Field of Classification Search
None
See application file for complete search history.

(56) References Cited

U.S. PATENT DOCUMENTS 10,397,404 B1 * 8/2019 Amir .................... G06T 1/20
10,602,302 B1   3/2020 Lyren
(Continued)

FOREIGN PATENT DOCUMENTS

JP   3598509 B2   9/2004
JP   6813670 B2   12/2020
(Continued)

OTHER PUBLICATIONS

International Search Report for PCT/KR2022/005079, mailed Jul. 8, 2022, 3 pages.
(Continued)

*Primary Examiner* — Duc Nguyen
*Assistant Examiner* — Assad Mohammed
(74) *Attorney, Agent, or Firm* — Nixon & Vanderhye P.C.

(57) ABSTRACT

An electronic device may include: a display module for displaying a screen and receiving a user input; a memory in which computer-executable instructions are stored; and a processor for accessing the memory and executing the instructions. The processor/instructions may be configured to: overlay, with a counterpart screen displayed on the screen as the center, a polygon-shaped 3D grid including a plurality of virtual planes, if a user input for a multimedia object is received through the display module during a video call; and transmit, to a counterpart terminal, location information about a selected plane in response to the user input for the plane in which the multimedia object is to be located from among the plurality of planes, and at least some pieces of data on the multimedia object. Other various embodiments are possible.

18 Claims, 18 Drawing Sheets

(51) Int. Cl.
  *G06T 19/00* (2011.01)
  *G06T 19/20* (2011.01)

(52) U.S. Cl.
  CPC ..... *H04N 7/152* (2013.01); *G06T 2219/2016* (2013.01)

(56) References Cited

U.S. PATENT DOCUMENTS

| | | | | |
|---|---|---|---|---|
| 2006/0152507 | A1* | 7/2006 | Lee | G06T 15/205 345/423 |
| 2011/0296318 | A1* | 12/2011 | Takayama | G06Q 30/02 715/757 |
| 2011/0310040 | A1* | 12/2011 | Ben-Shalom | G06F 3/04186 345/173 |
| 2017/0237789 | A1* | 8/2017 | Harner | H04L 65/4015 709/205 |
| 2017/0295278 | A1 | 10/2017 | Lyren et al. | |
| 2018/0139565 | A1* | 5/2018 | Norris | H04S 7/304 |
| 2019/0054379 | A1* | 2/2019 | Ackley | G06T 19/006 |
| 2020/0107888 | A1* | 4/2020 | Suchy | G06T 19/006 |

FOREIGN PATENT DOCUMENTS

| | | | |
|---|---|---|---|
| KR | 20080025227 | A | 3/2008 |
| KR | 20150143659 | A | 12/2015 |
| KR | 20170078785 | A | 7/2017 |
| KR | 20180022352 | A | 3/2018 |
| KR | 20190018243 | A | 2/2019 |
| KR | 102004265 | B1 | 7/2019 |

OTHER PUBLICATIONS

Written Opinion of the ISA for PCT/KR2022/005079, mailed Jul. 8, 2022, 4 pages.
Korean Office Action dated Sep. 18, 2025 for KR Application No. 10-2021-0071217.

* cited by examiner

ELECTRONIC DEVICE FOR SUPPORTING VARIOUS COMMUNICATIONS DURING VIDEO CALL, AND OPERATING METHOD THEREFOR

CROSS-REFERENCE TO RELATED APPLICATIONS

This application is a continuation application of International Application No. PCT/KR2022/005079 designating the United States, filed on Apr. 8, 2022, in the Korean Intellectual Property Receiving Office and claiming priority to Korean Patent Application No. 10-2021-0071217, filed on Jun. 2, 2021, in the Korean Intellectual Property Office, the disclosures of which are incorporated by reference herein in their entireties.

BACKGROUND

Technical Field

Various example embodiments relate to an electronic device for supporting various communication during a video call, and/or an operating method of the electronic device.

Description of Related Art

As electronic devices such as smartphones, tablet personal computers (PCs), and the like have recently grown rapidly, electronic devices enabling wireless voice calls and information exchanges have become necessities of life. Electronic devices were initially recognized as simple portable devices for wireless calls. However, as related technology has been developed and wireless Internet has been introduced, electronic devices are no longer simple portable devices for wireless calls but have become multimedia devices that perform functions such as scheduling, gaming, remote control, or image capturing, satisfying user demands.

Recently, electronic devices providing an augmented reality (AR) service, in particular, have been introduced on the market. The AR service, which is a service of superimposing a virtual image having supplementary information on a real-world image viewed by a user to show a result therefrom, may provide a user with a virtual image including content related to a real object identified from a real-world image.

An electronic device providing the AR service may operate while worn on a user. Such an electronic device may include, for example, a wearable electronic device, and a glass-type electronic device, in particular.

A wearable electronic device has now diversified functions. The functions include, for example, data and voice communication, image and video capturing with cameras, voice recording, music file play through a speaker system, and image or video output to a display. Some electronic devices have added functions such as an electronic game play function or a multimedia player function. In particular, a recent electronic device may receive a multicast signal that provides visual content.

SUMMARY

According to various example embodiments, there is provided an electronic device for supporting new communication using a position during a video call.

According to an example aspect, an electronic device may include: a display module that displays a screen and receives a user input; a memory that stores computer-executable instructions; and a processor that accesses the memory and executes the instructions. The processor/instructions may be configured to: when a user input for a multimedia object is received through the display module during a video call, overlay a polygon-shaped 3D grid including a plurality of virtual planes, having, at the center, a counterpart screen displayed on the screen; and transmit position information of a selected plane and at least a portion of data on the multimedia object to a counterpart terminal in response to a user input on a plane on which the multimedia object is to be located.

According to an example aspect, an operating method of an electronic device may include: when a user input for a multimedia object (e.g., a graphic object) is received during a video call, overlaying a polygon-shaped 3D grid including a plurality of virtual planes, having, at the center, a counterpart screen displayed on a screen of the electronic device; and transmitting position information of a selected plane and at least a portion of data on the multimedia object to a counterpart terminal in response to a user input on the plane on which the multimedia object is to be located among the plurality of planes.

According to an example aspect, a non-transitory computer-readable recording medium in which a program for controlling operations of an electronic device is recorded may include the program configured to cause the electronic device to: when receiving a user input for a multimedia object (e.g., a graphic object) while performing a video call, overlay a polygon-shaped 3D grid including a plurality of virtual planes, having, at the center, a counterpart screen of a counterpart displayed on a screen of the electronic device; and transmit, to a counterpart terminal of the counterpart, position information of a selected plane and at least a portion of data on the multimedia object, in response to a user input on a plane on which the multimedia object is to be located among the plurality of planes.

According to various example embodiments, a communication method using a position may be provided in an electronic device having a flat display and performing a video call.

According to various example embodiments, a communication method using a 360-degree (°) environment may be provided in a wearable device that supports a 360° environment and performing a video call.

In addition, various effects directly or indirectly ascertained through the present disclosure may be provided.

BRIEF DESCRIPTION OF DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1:
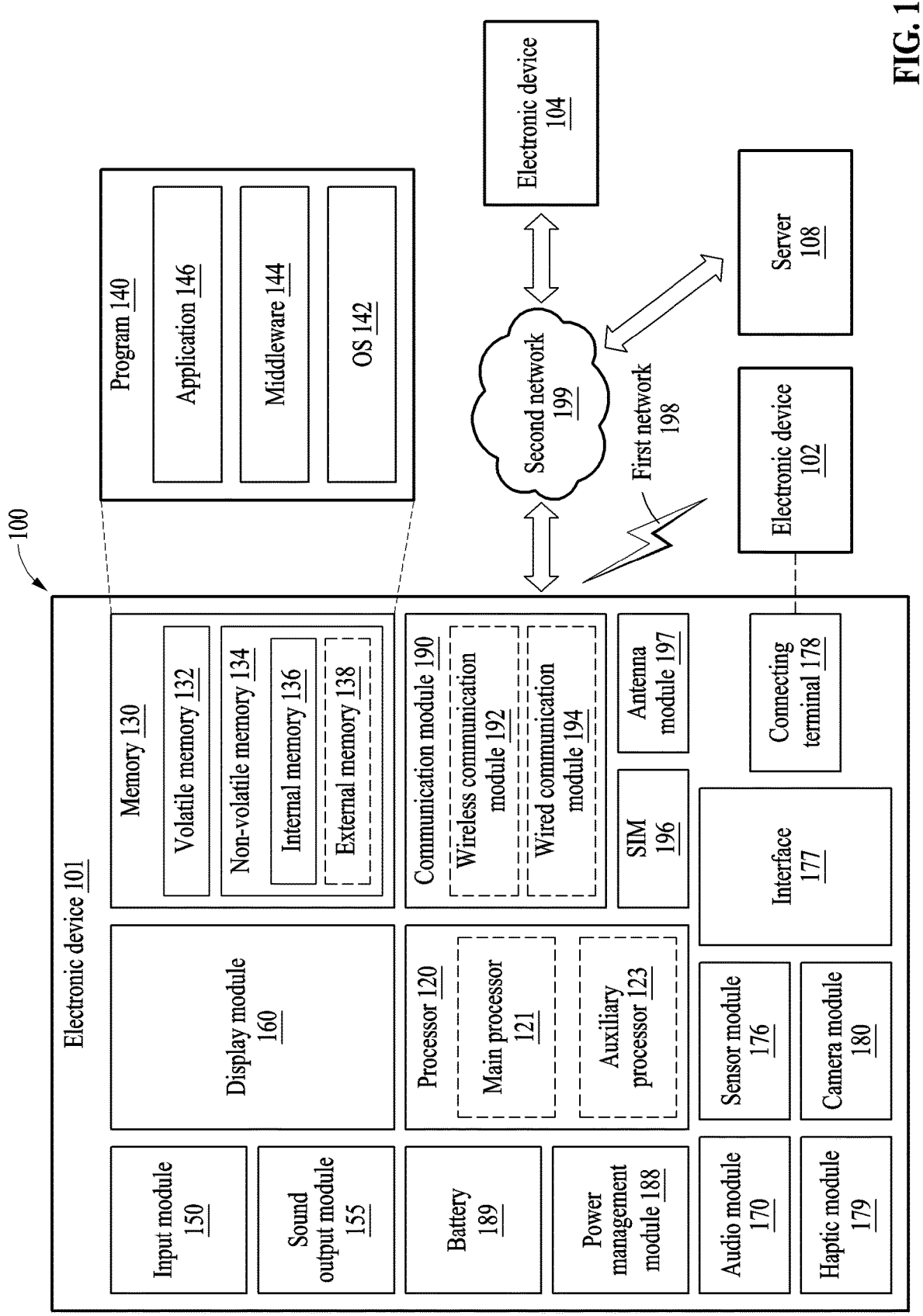
FIG. 1 is a block diagram illustrating an electronic device in a network environment according to various example embodiments.

Hereinafter, various example embodiments will be described in detail with reference to the accompanying drawings. When describing the examples with reference to the accompanying drawings, like reference numerals refer to like components and a repeated description related thereto is omitted.

FIG. 1 is a block diagram illustrating an electronic device 101 in a network environment 100 according to various example embodiments.

Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). The electronic device 101 may communicate with the electronic device 104 via the server 108. The electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected, directly or indirectly, to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. The processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specifically for artificial intelligence (AI) model processing. An AI model may be generated by machine learning. The learning may be performed by, for example, the electronic device 101, in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. The receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control its corresponding one of the displays, the hologram device, and the projector. The display module 160 may include a touch sensor adapted to sense a touch, or a pressure sensor adapted to measure an intensity of a force of the touch.

The audio module 170 may convert sound into an electric signal or vice versa. The audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with an external electronic device (e.g., the electronic device 102) directly (e.g., by wire) or wirelessly. The interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). The connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. The haptic module 179 may include, for example, a motor, a piezoelectric element, or an electric stimulator.

The camera module 180 may capture a still image and moving images. The camera module 180 may include one or more lenses, image sensors, ISPs, and flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., an LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a $4^{th}$ generation (4G) network, and a next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large-scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form an mmWave antenna module. The mmWave antenna module may include a PCB, an RFIC on a first surface (e.g., a bottom surface) of the PCB or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device (e.g., the electronic device 104) via the server 108 coupled, directly or indirectly, with the second network 199. Each of the external electronic devices (e.g., the electronic device 102 or 104) may be a device of the same type as or a different type from the electronic device 101. All or some of operations to be executed by the electronic device 101 may be executed by one or more of the external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or service, may request one or more external electronic devices to perform at least a part of the function or service. The one or more external electronic devices receiving the request may perform the at least part of the function or the service requested, or an additional function or an additional service related to the request and may transfer a result of the performance to the electronic device 101. The electronic device 101 may provide the result, with or without further processing of the result, as at least part of a response to the request. To that end, cloud computing, distributed computing, mobile edge computing (MEC), or client-server computing technology may be used, for example. The electronic device 101 may provide ultra-low latency services using, e.g., distributed computing or MEC. According to another embodiment, the external electronic device (e.g., the electronic device 104) may include an Internet-of-things (IoT) device. The server 108 may be an intelligent server using machine learning and/or a neural network. The external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2:
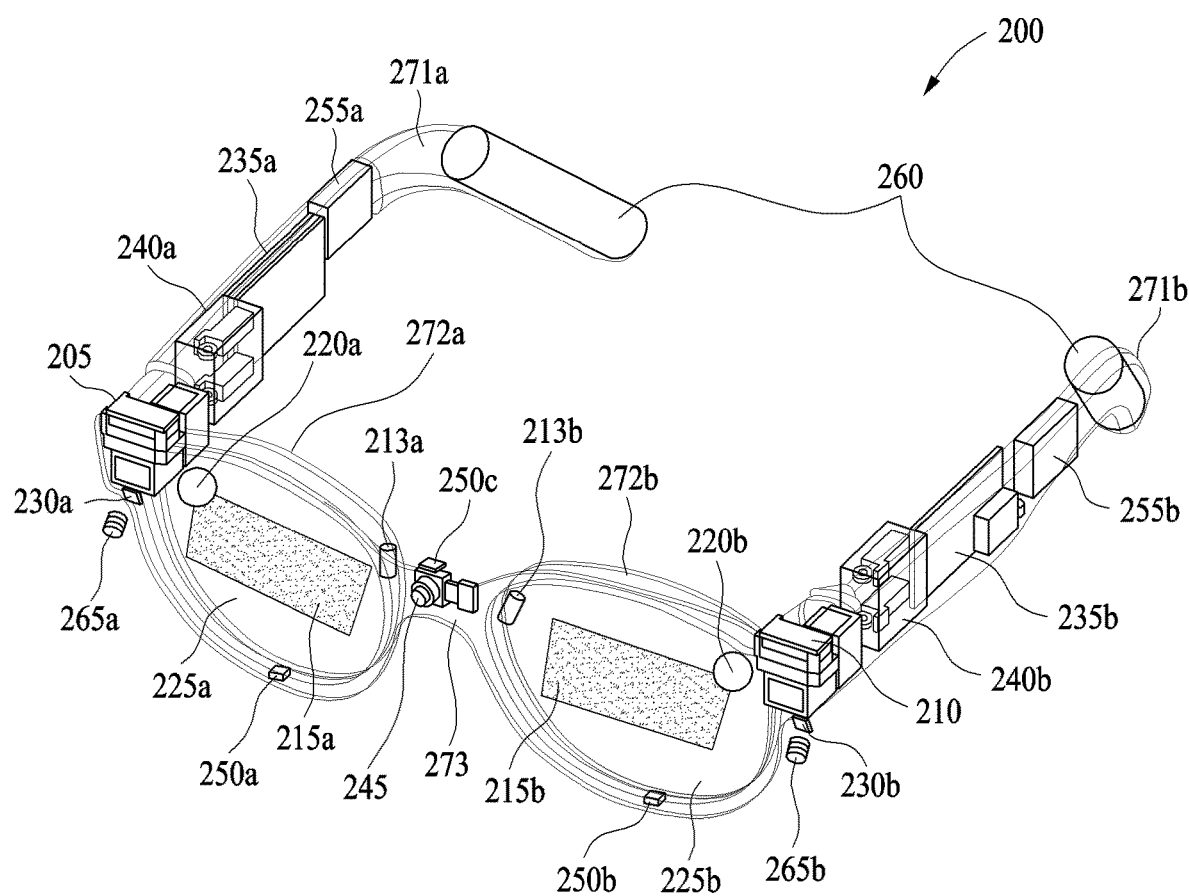
FIG. 2 is a diagram illustrating a structure of a wearable electronic device according to various example embodiments.

FIG. 2 is a diagram illustrating a structure of a wearable electronic device according to various example embodiments.

Referring to FIG. 2, a wearable electronic device 200 (e.g., the electronic device 101 of FIG. 1) may be worn on a face of a user to provide the user with an image associated with an augmented reality (AR) service and/or a virtual reality (VR) service.

In an example embodiment, the wearable electronic device 200 may include a first display 205, a second display 210, optical waveguides 215a and 215b, input optical members 220a and 220b, a first transparent member 225a, a second transparent member 225b, lighting units 230a and 230b, a first printed circuit board (PCB) 235a, a second PCB 235b, a first hinge 240a, a second hinge 240b, a first camera 245, a plurality of microphones (e.g., a first microphone 250a, a second microphone 250b, and a third microphone 250c), a plurality of speakers (e.g., a first speaker 255a and a second speaker 255b), a battery 260, a second camera 265a, and a third camera 265b.

In an example embodiment, a display (e.g., the first display 205 and the second display 210) (e.g., the display module 160 of FIG. 1) may include, for example, a liquid crystal display (LCD), a digital mirror device (DMD), a liquid crystal on silicon (LCoS), an organic light-emitting diode (OLED), a micro light-emitting diode (micro-LED), or the like. Although not shown, when the display is one of an LCD, a DMD, and an LCoS, the wearable electronic device 200 may include a light source configured to emit light to a screen output area of the display. In another example embodiment, when the display is configured to generate light by itself, for example, when the display is either an OLED or a micro-LED, the wearable electronic device 200 may provide a virtual image with a relatively high quality to the user even though a separate light source is not included. For example, when the display is implemented as an OLED or a micro-LED, a light source may be unnecessary, which may lead to lightening of the wearable electronic device 200. Hereinafter, a display capable of generating light by itself may be referred to as a "self-luminous display," and the description thereof will be made on the assumption of the self-luminous display.

A display (e.g., the first display 205 and the second display 210) according to various embodiments may include at least one micro-LED. For example, the micro-LED may express red (R), green (G), and blue (B) by emitting light by itself, and a single chip may implement a single pixel (e.g., one of R, G, and B pixels) because the micro-LED is relatively small in size (e.g., 100 μm or less). Accordingly, the display may provide a high resolution without a backlight unit (BLU), when the display is composed of a micro-LED.

However, the example embodiments are not limited thereto, and a single pixel may include R, G, and B, and a single chip may be implemented by a plurality of pixels including R, G, and B pixels.

In an example embodiment, the display (e.g., the first display 205 and the second display 210) may include pixels for displaying a virtual image. The display may further include infrared pixels that emit infrared light.

In an example embodiment, the display may further include light-receiving pixels (e.g., photo sensor pixels) that are disposed between pixels and configured to receive light reflected from the eyes of a user, convert the received light to electrical energy, and output the electrical energy. A light-receiving pixel may be referred to as a gaze tracking sensor. The gaze tracking sensor may detect infrared light generated as light emitted by an infrared pixel included in the display is reflected by the eyes of a user.

In an example embodiment, the wearable electronic device 200 may include separate gaze tracking cameras 213*a* and 213*b* (e.g., IR LED detection sensors). The gaze tracking cameras 213*a* and 213*b* may detect infrared light reflected by the eyes of a user. The wearable electronic device 200 may track a gaze of the user based on the infrared light detected by the gaze tracking cameras 213*a* and 213*b*. The wearable electronic device 200 may determine a central position of a virtual image according to gaze directions (e.g., directions in which pupils of a right eye and a left eye of the user gaze) of the right eye and the left eye of the user. "Based on" as used herein covers based at least on.

In another example embodiment, the wearable electronic device 200 may detect a gaze direction (e.g., a movement of pupils) of the user, using the light-receiving pixels. For example, the wearable electronic device 200 may detect and track a gaze direction of the right eye of the user and a gaze direction of the left eye of the user through one or more light-receiving pixels of the first display 205 and one or more light-receiving pixels of the second display 210. The wearable electronic device 200 may determine a central position of a virtual image according to the gaze directions (e.g., directions in which pupils of the right eye and the left eye of the user gaze) of the right eye and the left eye of the user detected through the one or more light-receiving pixels.

The first display 205 and the second display 210 may each include a first control circuit (not shown). The first control circuit may control the first display 205 and the second display 210. The first control circuit may control an operation of a liquid crystal element of a transparent cover (not shown) included in each of the first display 205 and the second display 210.

In an example embodiment, light emitted from the display (e.g., the first display 205 and the second display 210) may reach the optical waveguide 215*a* formed on the first transparent member 225*a* that faces the right eye of the user, and the optical waveguide 215*b* formed on the second transparent member 225*b* that faces the left eye of the user, by passing through a lens (not shown) and a waveguide. For example, the light emitted from the display (e.g., the first display 205 and the second display 210) may be reflected from a grating area of the waveguide formed in the optical waveguides 215*a* and 215*b* and the input optical members 220*a* and 220*b* to be transmitted to the eyes of the user. The first transparent member 225*a* and/or the second transparent member 225*b* may be formed as, for example, a glass plate, a plastic plate, or a polymer, and may be transparently or translucently formed. The first transparent member 225*a* and the second transparent member 225*b* may each include a transparent substrate on which a transparent electrode (e.g., indium tin oxide (ITO)) is disposed.

In an example embodiment, the lens (not shown) may be disposed on a front surface of the display (e.g., the first display 205 and the second display 210). The lens (not shown) may include a concave lens and/or a convex lens. For example, the lens (not shown) may include a projection lens or a collimation lens.

In an example embodiment, the optical waveguides 215*a* and 215*b* or a transparent member (e.g., the first transparent member 225*a* and the second transparent member 225*b*) may include a lens including a waveguide or a reflective lens. The waveguide may be referred to as an "optical waveguide". The waveguide may be a path through which external light is incident, totally reflected, and emitted, and may be distinguished from the first transparent member 225*a* and the second transparent member 225*b* through which external light is simply reflected or transmitted.

In an example embodiment, the waveguide may be formed of glass, plastic, or a polymer, and may have a nanopattern formed on one surface of the inside or outside thereof, for example, a grating structure of a polygonal or curved shape. According to an example embodiment, light incident at one end of the waveguide through the input optical members 220*a* and 220*b* may be propagated inside a display waveguide by the nanopattern to be provided to the user. For example, a waveguide including a freeform prism may provide incident light to a user through a reflection mirror. The waveguide may include at least one of a reflective element (e.g., a reflection mirror) and at least one diffractive element (e.g., a diffractive optical element (DOE) or a holographic optical element (HOE)). In an example embodiment, the waveguide may guide light emitted from the display (e.g., 205 and 210) to the eyes of the user, using the at least one diffractive element or the reflective element included in the waveguide.

According to various example embodiments, the diffractive element may include an input optical member (e.g., 220*a* and 220*b*) and/or an output optical member (not shown). For example, the input optical member (e.g., 220*a* and 220*b*) may refer to an input grating area, and the output optical member (not shown) may refer to an output grating area. The input grating area may function as an input terminal to diffract (or reflect) light output from the display (e.g., the first display 205 and the second display 210 (e.g., a micro-LED)) to transmit the light to the optical waveguides 215*a* and 215*b*. The output grating area may function as an exit to diffract (or reflect) light transmitted to the waveguide to the eyes of a user.

The waveguide may function as a path through which light passes. The waveguide may include an input optical member (e.g., 220*a* and 220*b*) and an output optical member (not shown). An area of the waveguide in which light is totally reflected may be combined with or separated from the input optical member (e.g., 220*a* and 220*b*) and the output optical member (not shown).

According to various example embodiments, the reflective element may include a total internal reflection optical element or a total internal reflection waveguide for total internal reflection (TIR). For example, TIR, which is one of schemes of inducing light, may form an angle of incidence such that light (e.g., a virtual image) entering through the input grating area is completely or almost completely reflected from one surface (e.g., a specific surface) of the waveguide, to completely or almost completely transmit the light to the output grating area.

In an example embodiment, the light emitted from the display (e.g., 205 and 210) may be guided by the waveguide through the input optical member (e.g., 220*a* and 220*b*). Light traveling in the waveguide may be guided toward the eyes of the user through the output optical member. A screen output area may be determined based on light emitted toward the eyes of the user.

In an example embodiment, the first camera 245 may be referred to as a "high resolution (HR)" or a "photo video (PV)", and may include a high-resolution camera. The first camera 245 may include a color camera having functions for obtaining a high-quality image, such as, for example, an automatic focus (AF) function and an optical image stabilizer (OIS). However, examples are not limited thereto, and the first camera 245 may include a global shutter (GS) camera or a rolling shutter (RS) camera.

In an example embodiment, the second camera 265a and the third camera 265b may include cameras used for three degrees of freedom (3DoF) and six degrees of freedom (6DoF) head tracking, hand detection and tracking, and gesture and/or space recognition. For example, the second camera 265a and the third camera 265b may each include a GS camera to detect a movement of a head or a hand and track the movement.

In an example embodiment, at least one sensor (not shown, e.g., a gyro sensor, an acceleration sensor, a geomagnetic sensor, and/or a gesture sensor), the second camera 265a, and the third camera 265b may perform at least one of head tracking for 6DoF, pose estimation and prediction, gesture and/or space recognition, and simultaneous localization and mapping (SLAM) through depth imaging.

In another example embodiment, the second camera 265a and the third camera 265b may be classified and used as a camera for head tracking and a camera for hand tracking.

In an example embodiment, the lighting units 230a and 230b may be omitted. The lighting units 230a and 230b may be replaced with the infrared pixels included in the first display 205 and the second display 210. In another example embodiment, the lighting units 230a and 230b may be included in the wearable electronic device 200 to assist the infrared pixels included in the first display 205 and the second display 210. The lighting units 230a and 230b may be used differently according to positions in which the lighting units 230a and 230b are attached. For example, the lighting units 230a and 230b may be attached together with the second camera 265a and the third camera 265b mounted around a hinge (e.g., the first hinge 240a and the second hinge 240b) that connects frames 272a and 272b and temples 271a and 271b or around a bridge 273 that connects frames. When image capturing is performed using a GS camera, the lighting units 230a and 230b may be used to supplement a surrounding brightness. For example, the lighting units 230a and 230b may be used in a dark environment or when it is not easy to detect a subject to be captured due to reflected light and a mixture of various light sources.

In an example embodiment, on a PCB (e.g., the first PCB 235a and the second PCB 235b), a second control circuit (not shown, e.g., the processor 120 of FIG. 1) that controls components of the wearable electronic device 200, excluding the first display 205 and the second display 210, may be disposed. The second control circuit may control the components other than the first display 205 and the second display 210 and perform an operation such as depth value estimation. The second control circuit may include a communication circuit (e.g., the communication module 190 of FIG. 1) or a memory (e.g., the memory 130 of FIG. 1). In an example embodiment, the first control circuit and the second control circuit may be integrated as a single circuit. For example, the integrated control circuit may control the first display 205, the second display, and/or other components.

In an example embodiment, the plurality of microphones (e.g., the first microphone 250a, the second microphone 250b, and the third microphone 250c) (e.g., the input module 150 of FIG. 1) may process an external acoustic signal into electrical audio data. The electrical audio data may be used in various ways according to a function (or an application) being executed in the wearable electronic device 200.

In an example embodiment, the plurality of speakers (e.g., the first speaker 255a and the second speaker 255b) (e.g., the sound output module 155 of FIG. 1) may output audio data received from a communication circuit (e.g., the communication module 190 of FIG. 1) or stored in a memory (e.g., the memory 130 of FIG. 1).

In an example embodiment, the battery 260 (e.g., the battery 189 of FIG. 1) may be provided as one or more batteries and may supply power to components of the wearable electronic device 200.

According to various example embodiments described herein, an electronic device may be a device of one of various types. The electronic device may include, as non-limiting examples, a portable communication device (e.g., a smartphone), a computing device, a portable multimedia device, a portable medical device, a camera, a wearable device, or a home appliance. However, the electronic device is not limited to the foregoing examples.

It is to be understood that various example embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B, or C," "at least one of A, B, and C," and "at least one of A, B, or C," each of which may include any one of the items listed together in the corresponding one of the phrases, or all possible combinations thereof. Terms such as "1st" and "2nd" or "first" and "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., by wire), wirelessly, or via at least a third element(s).

As used in connection with certain embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC). Thus, each "module" herein may comprise circuitry.

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method described herein may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

<Example Electronic Device Transmitting a Multimedia Object>

Figure 3:
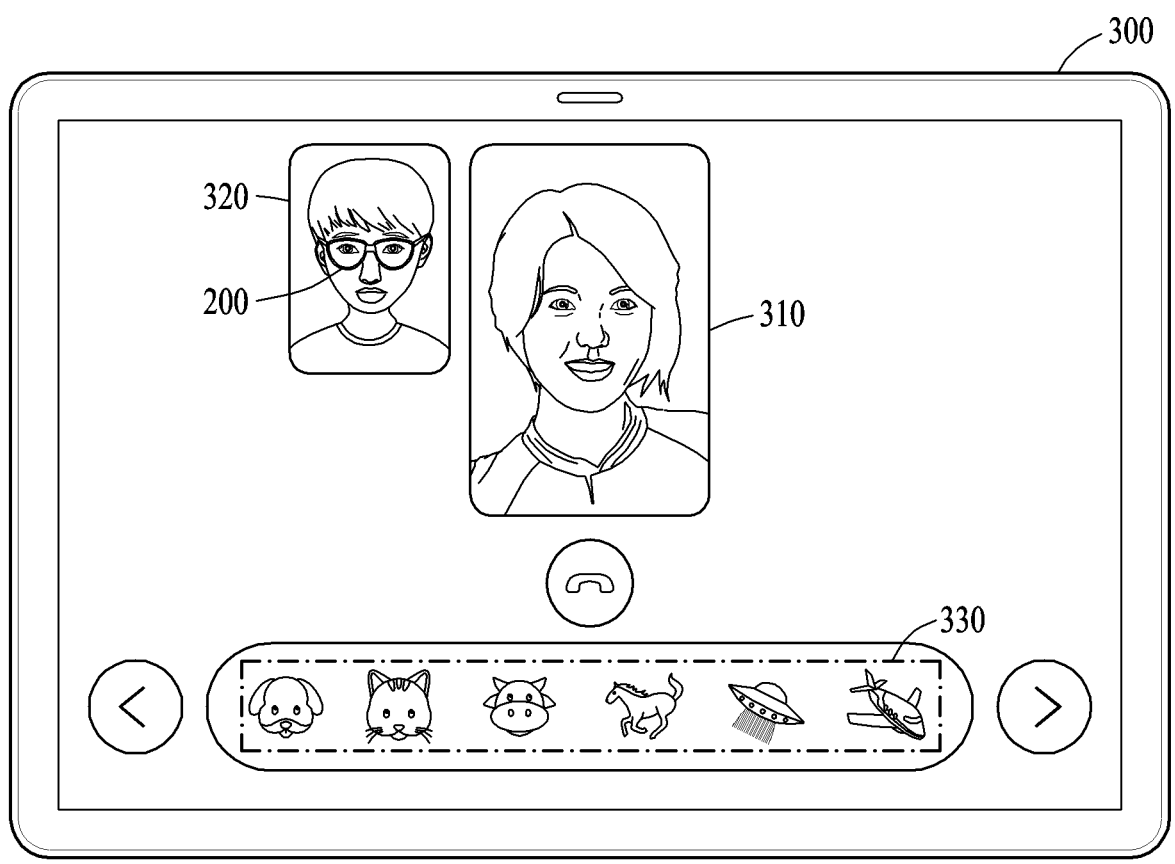
FIG. 3 is a diagram illustrating an electronic device performing a video call according to various example embodiments.

FIG. 3 is a diagram illustrating an electronic device performing a video call according to various example embodiments.

FIG. 3 shows a screen of an electronic device performing a video call. For simplicity of description, an electronic device 300 performing a video call is shown in FIG. 3 as the electronic device 101 of FIG. 1 having a flat display, such as, a tablet or a smartphone, but examples are not limited thereto. For example, the electronic device 300 performing a video call shown in FIG. 3 may also be the wearable electronic device 200 of FIG. 2.

As described above with reference to FIG. 1, the electronic device 300 may include a memory 130 storing computer-executable instructions and a processor 120 configured to access the memory 130 and execute the instructions, and the instructions may be configured to transmit a multimedia object to a terminal of a counterpart, or a counterpart terminal hereinafter, during a video call, as will be described below with reference to FIGS. 4 to 7B.

According to an example embodiment, the memory 130 of the electronic device 300 may store, as software, a program (e.g., the program 140 of FIG. 1) for transmitting position information and a multimedia object to a counterpart terminal based on a user input. For example, an operating system (OS) (e.g., the OS 142 of FIG. 1), middleware (e.g., the middleware 144 of FIG. 1), or an application (e.g., the application 146 of FIG. 1) may be included in the memory 130. The instructions stored in the memory 130 may be implemented as one functional module in the OS (e.g., the OS 142 of FIG. 1), implemented in the form of middleware (e.g., the middleware 144 of FIG. 1), or implemented in the form of a separate application (e.g., the application 146 of FIG. 1).

FIG. 3 shows a screen displayed through a display module 160 in the electronic device 300 performing a video call. During a video call, on a screen of the electronic device 300, a screen 310 captured by a counterpart terminal and a screen 320 captured by the electronic device 300 which is its own terminal 300 may be displayed. Each of the screens 310 and 320 may be displayed in a picture-in-picture (PIP) form. According to an example embodiment, in a case of the terminal 300 being the wearable electronic device 200, an appearance with the wearable electronic device 200 on may be displayed on the screen 320 captured by the terminal 300.

According to an example embodiment, multimedia objects 330 may be displayed on the screen of the electronic device 300 performing a video call. According to various example embodiments, multimedia objects may include emoticons, avatars, characters, AR emojis, stickers, and the like that diversify a communication process, and may include graphic objects and sounds. According to an example embodiment, a sound included in a multimedia object may be a binaural sound. The binaural sound, which is a three-dimensional (3D) or stereo sound that maximizes the sense of space and the sense of reality, may refer to a sound recorded through binaural recording using a phase difference between the ears. A user who listens to the binaural sound may have a user experience of feeling as if the sound is generated from a specific source.

Figure 4A:
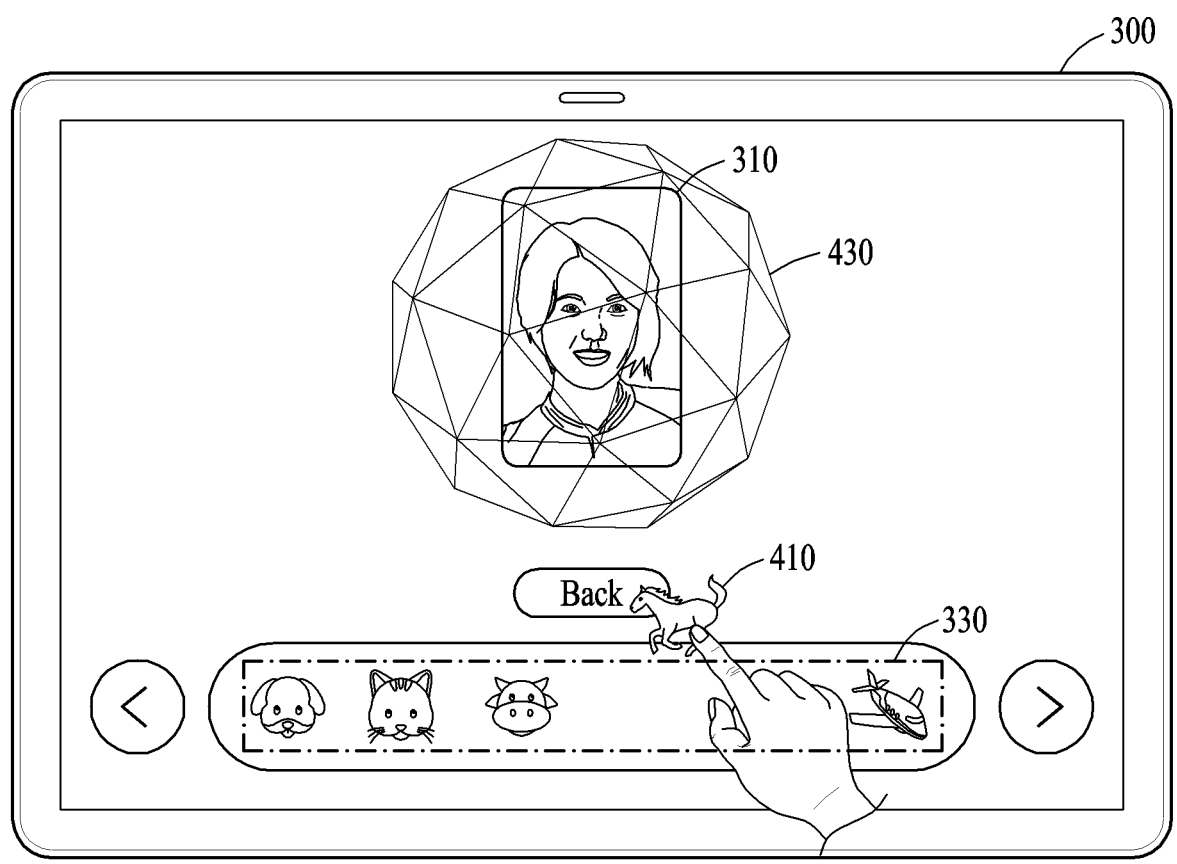
FIGS. 4A and 4B are diagrams illustrating a virtual three-dimensional (3D) grid in which a multimedia object is located, output from an electronic device performing a video call, according to various example embodiments.
Figure 4B:
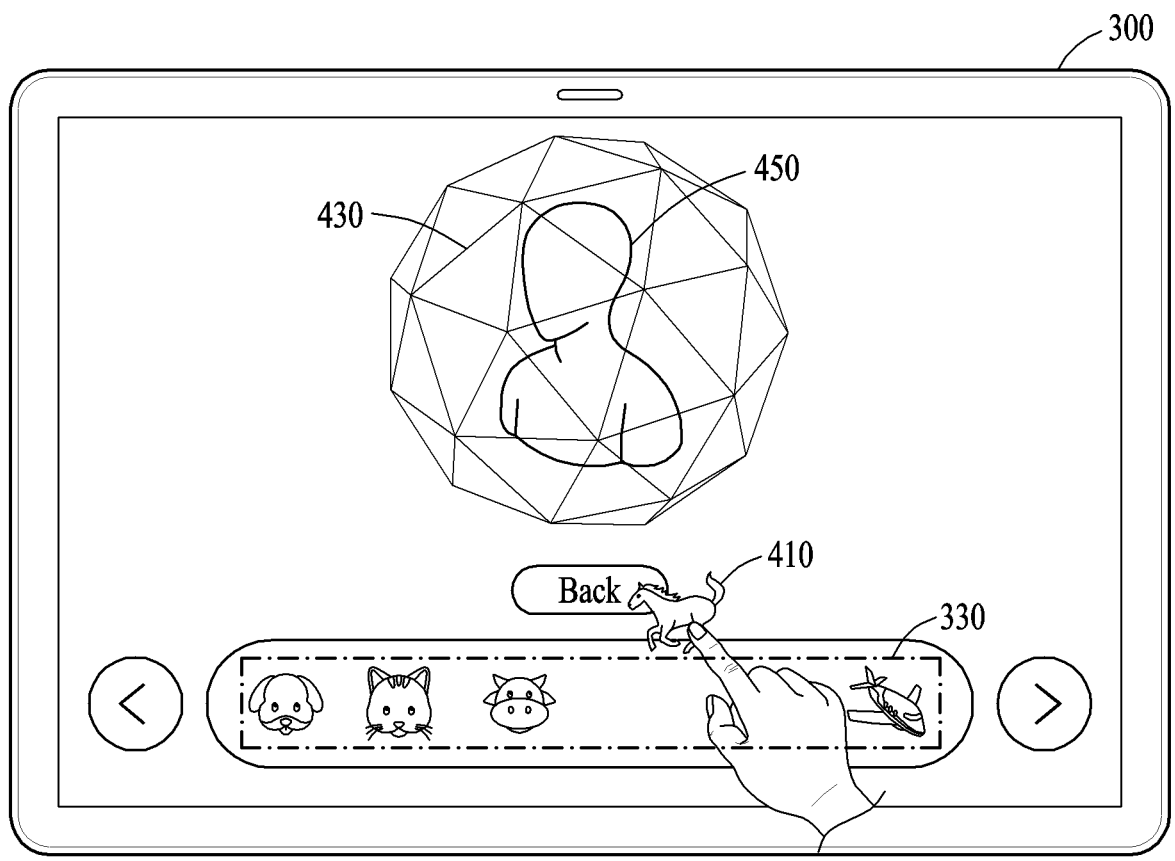

FIGS. 4A and 4B are diagrams illustrating a virtual 3D grid in which a multimedia object is located, output from an electronic device performing a video call, according to various example embodiments.

FIG. 4A shows how the electronic device 300 performing a video call outputs a virtual guide in which a multimedia object is located is output. According to an example embodiment, the processor 120 of the electronic device 300 may receive a user input 410 (e.g., touch, tap, voice, gesture, etc.) for a specific multimedia object to be transmitted to a counterpart terminal of a counterpart among multimedia objects 330 during a video call.

When the user input 410 for the multimedia object is detected through the display module 160 of the electronic device 300, the processor 120 may output a virtual guide in which the multimedia object is to be located with a counterpart screen 310 of the counterpart being at the center thereof. The virtual guide, which is a polygon-shaped 3D grid (e.g., a 3D grid 430) including a plurality of virtual planes, may be overlaid on the counterpart screen 310.

According to various example embodiments, the 3D grid 430 may be provided in various shapes of polygons, for example, regular hexahedron, regular octahedron, regular dodecahedron, icosahedron, and other polyhedrons including a plurality of planes.

According to an example embodiment, each electronic device 300 may support different shape of a polygon, and the shape of a polygon may be determined before a video call is performed. According to another example embodiment, a user may download various types of 3D grids from an external server and select and use one of them supported by the electronic device 300.

According to an example embodiment, the 3D grid 430 may include position information about a plurality of planes. For example, the 3D grid 430 may include information about coordinates of vertices of the 3D grid 430 on a virtual coordinate system having, as its origin, the center of the counterpart screen 310. According to another example embodiment, an index of each of the planes may be determined, and corresponding index information may be included in the 3D grid 430.

FIG. 4B shows a screen including a 3D grid 430 generated based on a 3D mesh 450. As described above with reference to FIG. 4A, when detecting a user input 410 for a multimedia object to be transmitted to a counterpart terminal of a counterpart among multimedia objects 330, the processor 120 may overlay a virtual 3D grid on which the multimedia object is to be located. Referring to FIG. 4B, the 3D grid 430 with the 3D mesh 450 as the center may be generated. The 3D mesh 450 may be generated, in place of a counterpart screen 430, to accurately inform the user who desires to transmit a multimedia object of a relative position with respect to the counterpart, and may be modeled in a typical human form. According to another example embodiment, the 3D mesh 450 may be modeled according to the shape of a face of the counterpart by recognizing the face of the counterpart within the counterpart screen 430. According to an example embodiment, the origin of the 3D grid 430 may be overlaid to have the same center as that of the 3D mesh 450.

Figure 5:
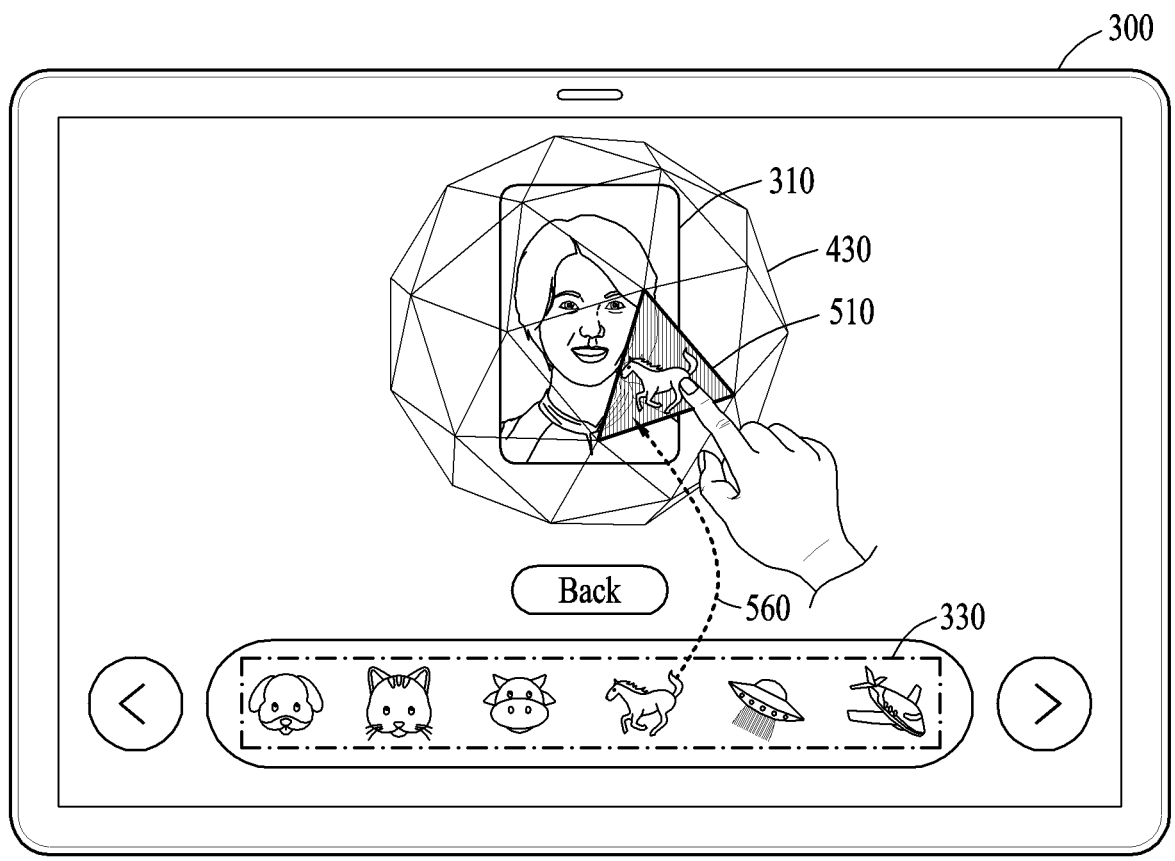
FIG. 5 is a diagram illustrating an operation of determining a plane on which a multimedia object is to be located according to various example embodiments.

FIG. 5 is a diagram illustrating an operation of determining a plane on which a multimedia object is to be located according to various example embodiments.

Referring to FIG. 5, after the 3D grid 430 is generated as described above with reference to FIGS. 4A and 4B, the processor 120 may determine a plane to which a multimedia object is to be transmitted from among a plurality of planes included in the 3D grid 430 based on a user input.

According to an example embodiment, as a user selects a multimedia object to be transmitted from a multimedia object list 330, the 3D grid 430 may be generated, and the processor 120 may receive a user input (e.g., touch, tap, etc.) for a plane among a plurality of planes. According to another example embodiment, when, after a user input for a multimedia object is detected, the multimedia object is dragged and dropped on a specific plane, the processor 120 may recognize the plane as a plane selected by the user. According to an example embodiment, the processor 120 may output a selected plane 510 in color different from those of other planes.

According to an example embodiment, when the user drags and drops a multimedia object onto a specific plane, and the multimedia object is dragged close to the 3D grid 430, a snapping guide 560 to a nearby plane (e.g., the plane 510 of FIG. 5) may be generated. The snapping guide 560, which is provided to intuitively inform the user of a plane on which a multimedia object is to be located, is shown as a dotted arrow in FIG. 5, but is not limited thereto and various example embodiments may also be possible. For example, the snapping guide 560 may be provided in the form of a solid arrow on a display for a predetermined period of time and then disappear.

According to an example embodiment, when a specific plane (e.g., the plane 510) is selected from among a plurality of planes of the 3D grid 430, position information of the plane may be transmitted to a counterpart terminal along with a multimedia object. The multimedia object may include graphic object information, sound information, and/or American Standard Code for Information Interchange (ASCII) code information. According to an example embodiment, the position information of the plane may include coordinates of vertices of the selected plane 510, as described above with reference to FIG. 4A. According to another example embodiment, when the 3D grid 430 is output, an index of each of the planes may be predetermined, and corresponding index information may be transmitted to the counterpart terminal.

According to an example embodiment, only an example of selecting a plane is described with reference to FIG. 5, but examples are not limited thereto. For example, based on a user input for a specific vertex of the 3D grid 430, the processor 120 may transmit, to the counterpart terminal, information about a position of the specific vertex along with a multimedia object.

According to an example embodiment, when the electronic device 300 transmitting a multimedia object and an electronic device receiving the multimedia object are both a wearable electronic device (e.g., the wearable electronic device 200), a user experience of having a conversation in the form of a hologram in a virtual environment may be provided, and there may be various possible examples based on a distance between such a transmitting electronic device 300 and a counterpart hologram.

For example, when a distance from the counterpart hologram becomes greater than a predetermined distance, the processor 120 of the transmitting wearable electronic device 200 may output a guide, such as, the snapping guide 560 of FIG. 5, to induce the use of a multimedia object. According to another example embodiment, when the distance from the counterpart hologram becomes greater than the predetermined distance, a phrase indicating to approach closer may be output. According to another example embodiment, information about the distance to the counterpart hologram may be further transmitted to the counterpart terminal. For example, in a case in which a counterpart hologram and an electronic device transmitting a multimedia object are separated from each other by 2 meters (m), when the electronic device transmits the multimedia object to a counterpart terminal, the processor 120 of the transmitting wearable electronic device 200 may also transmit, to the counterpart terminal, information about the distance of 2 m in addition to position information of a selected plane. According to an example embodiment, even when the transmitting electronic device 300 is not the wearable electronic device 200 but an electronic device having a flat display (e.g., the electronic device 101 of FIG. 1), a processor (e.g., the processor 120 of FIG. 1) may further transmit information about a distance between the multimedia object list 330 and the 3D grid 430 to the counterpart terminal. Various example embodiments regarding the information about the distance will be described in detail with reference to FIGS. 6A to 6C along with various example embodiments regarding the deformation of the 3D grid 430.

In the counterpart terminal receiving the position information and the multimedia object, a graphic object and a binaural sound may be provided based thereon. According to an example embodiment, the counterpart terminal may further receive the distance information, and the binaural sound converted based on the direction and distance based on the position information may be provided to the counterpart terminal, and for example, a sound that is felt as if approaching from where 2 m apart, may be output.

Various example embodiments in which a multimedia object is output from a counterpart terminal will be described in detail below with reference to FIGS. 8 and 9A to 9C.

Figure 6A:
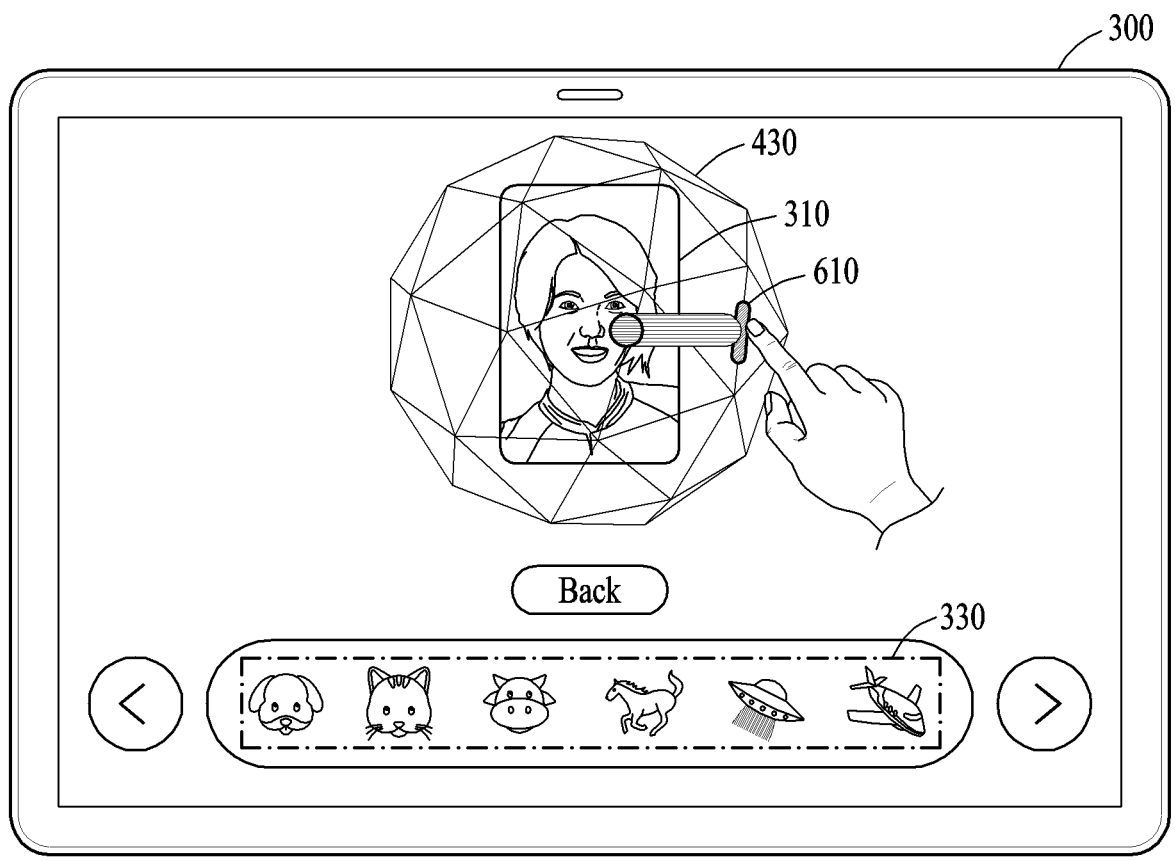
FIGS. 6A to 6C are diagrams illustrating an example of changing a position of a 3D grid according to various example embodiments.
Figure 6B:
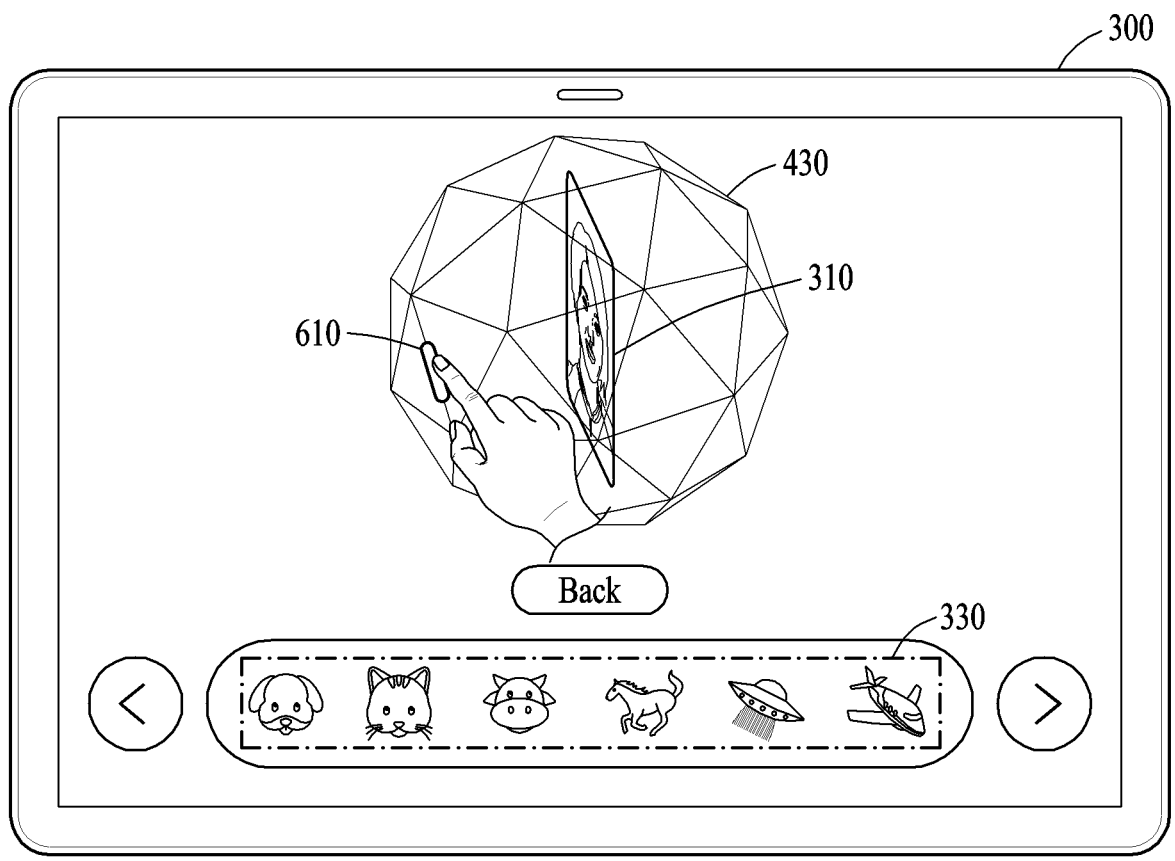
Figure 6C:
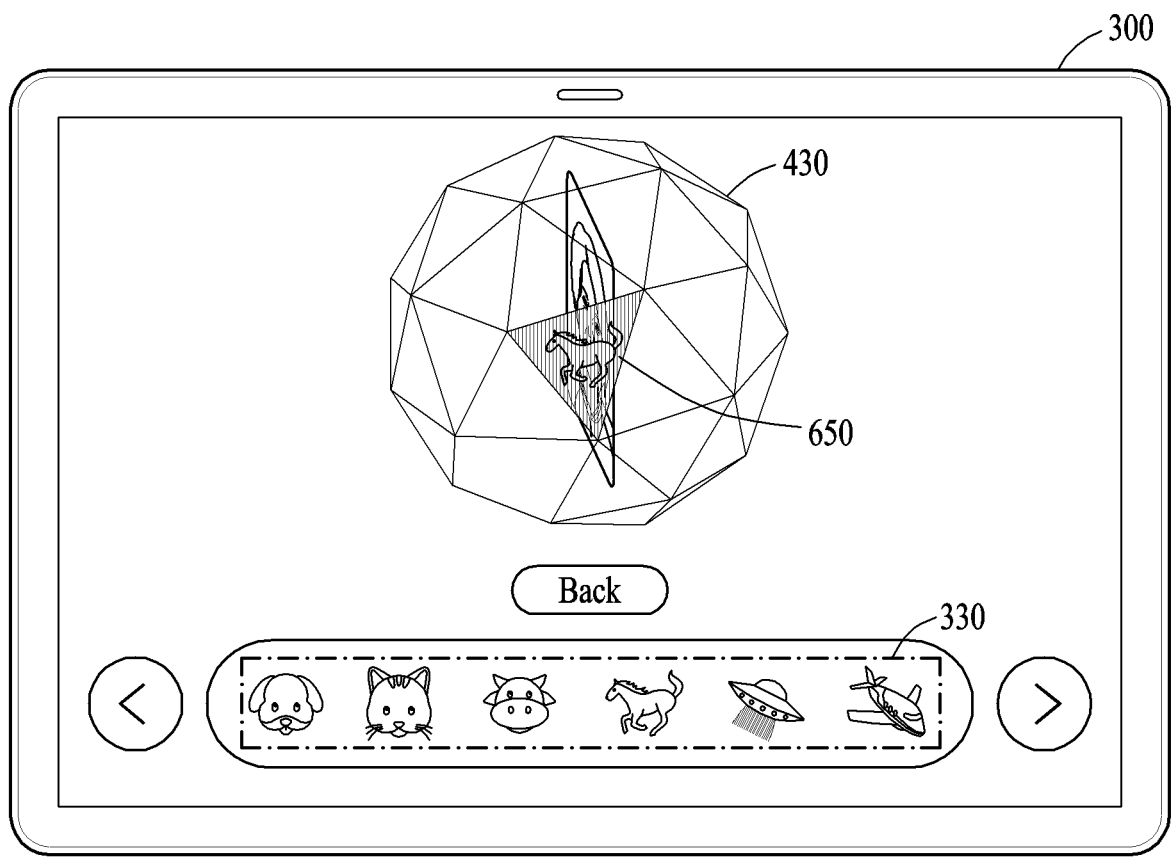

FIGS. 6A to 6C are diagrams illustrating an example of changing a position of a 3D grid according to various example embodiments.

FIGS. 6A to 6C show an example of changing a position of a 3D grid 430 with respect to a counterpart screen 310 based on a user input. Referring to FIG. 6A, a user who desires to transmit a multimedia object while performing a video call using the electronic device 300 may grab and move an arbitrary line 610 of the generated 3D grid 430, and the processor 120 may, based on this, output the counterpart screen 310 of which a direction is changed as shown in FIG. 6B and the 3D grid 430.

Referring to FIG. 6C, as described above with reference to FIG. 5, a user may select a plane 650 to which a multimedia object is to be transmitted. As the user unconstrainedly changes between the 3D grid 430 and the counterpart screen 310 as described above with reference to FIGS. 6A to 6C, the user may more intuitively recognize a position to which the multimedia object is to be transmitted. According to an example embodiment, the selected line 610 or plane 650 may be changed to a color different from those of other lines or planes, or to a thickness different from those of other lines or planes.

Although only an example embodiment in which the processor 120 outputs a 3D grid (e.g., the 3D grid 430) and a counterpart screen (e.g., the counterpart screen 310) of which a direction is changed through a user input for the 3D grid is described with reference to FIGS. 6A to 6C, but examples are not limited thereto. For example, the processor 120 may change the directions of the counterpart screen 310 and the 3D grid 430 based on a user input to an edge of the counterpart screen 310.

According to an example embodiment, the processor 120 may also adjust the size, in addition to changing the direction of the counterpart screen 310 and the 3D grid 430, based on a user input. For example, after a user input (e.g., touch, tap, etc.) on the counterpart screen 310 or the 3D grid 430 is detected, the processor 120 may adjust the size of the counterpart screen 310 and the 3D grid 430 based on pinch-zoom performed by the user (e.g., screen zoom-in or zoom-out by widening and narrowing the screen with two fingers).

According to an example embodiment, as described above with reference to FIG. 5, when the size of the counterpart screen 310 and a 3D grid decreases, the transmitting electronic device 300 may further transmit information about the distance based on the adjusted size to the counterpart terminal. For example, when a multimedia object is transmitted while a 3D grid is 30% smaller in size, the processor 120 may further transmit information about a distance that has increased by 30% from the basic distance value (e.g., 1 m) to the counterpart terminal. In addition, in the counterpart terminal, a binaural sound that is converted based on the increased distance and the direction based on the position information may be provided, and thus, for example, a sound felt as if approaching at a distance of 1.3 m may be output.

Figure 7A:
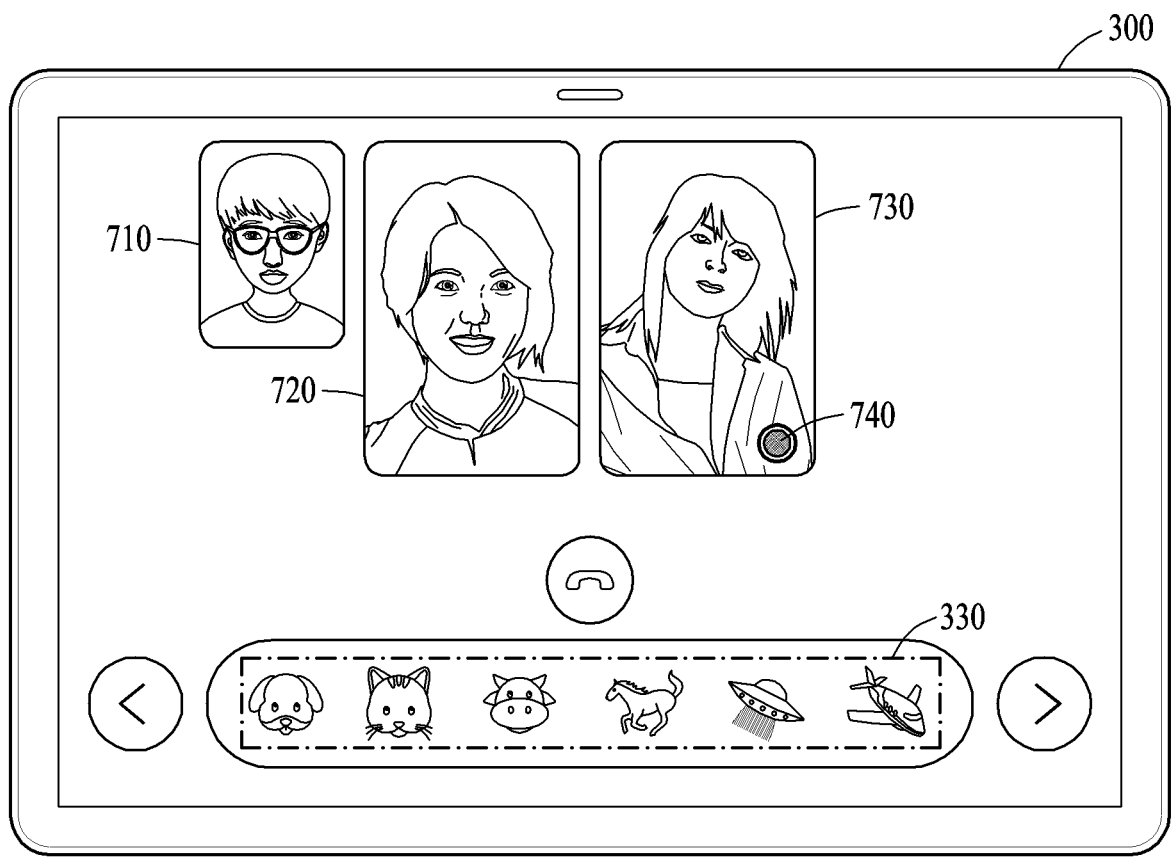
FIGS. 7A and 7B are diagrams illustrating an example of performing a video call with a plurality of terminals according to various example embodiments.
Figure 7B:
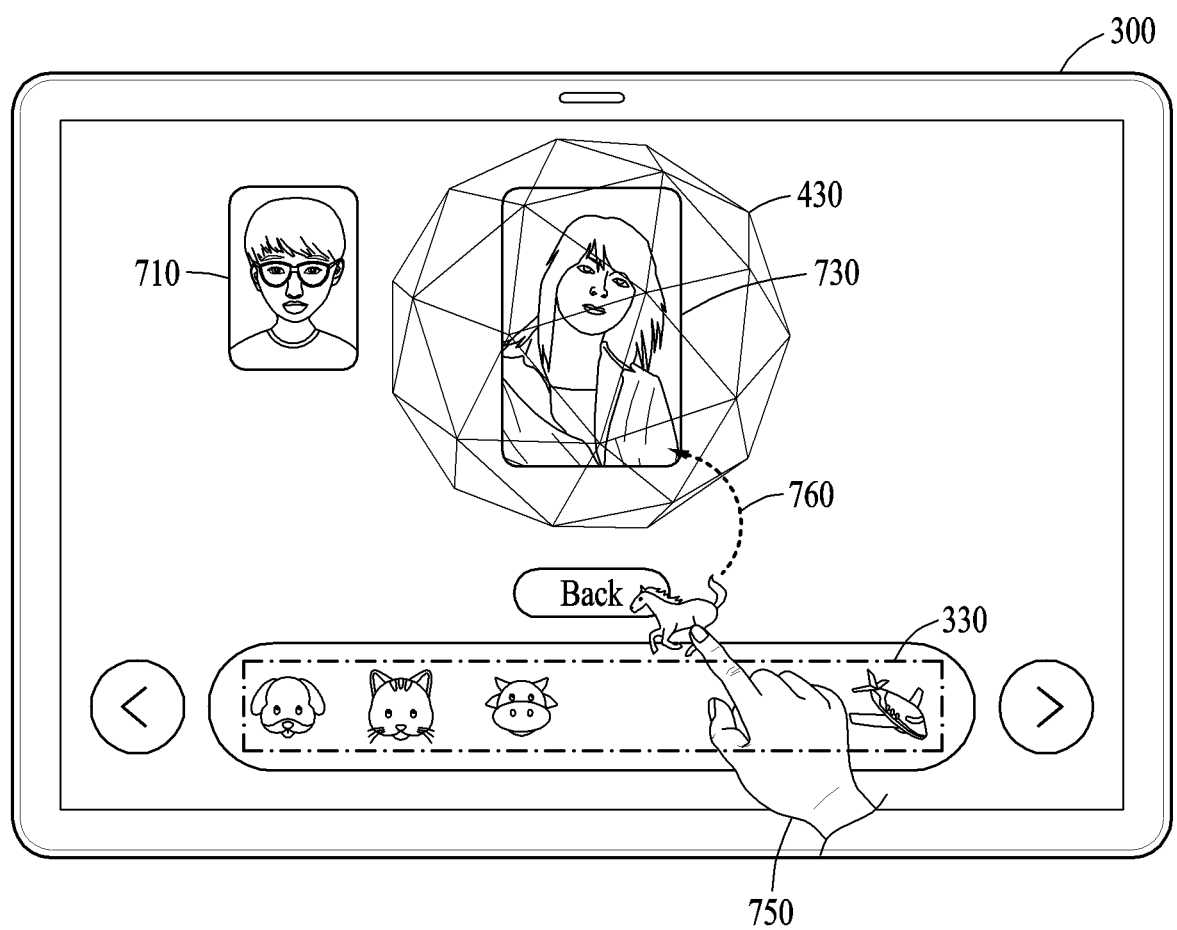

FIGS. 7A and 7B are diagrams illustrating an example of performing a video call with a plurality of terminals according to various example embodiments.

According to an example embodiment, even when performing a video call among two or more terminals, the processor 120 may transmit a multimedia object along with specific position information as described above with reference to FIGS. 3 to 6C.

FIG. 7A shows a screen of the electronic device 300 performing a video call among a plurality of terminals. As described above with reference to FIG. 3, the electronic device 300 may be the electronic device 101 of FIG. 1 having a flat display or the wearable electronic device 200 of FIG. 2. According to an example embodiment, as described above with reference to FIG. 3, my screen 710, a first counterpart screen 720 of a first counterpart, and a second counterpart screen 730 of a second counterpart, which are captured by the electronic device 300, may be output in a PIP form through the display module 160.

According to an example embodiment, the processor 120 may receive a user input for a specific counterpart screen (e.g., 730) among the counterpart screens 720 and 730 as shown in FIG. 7A, and output the selected counterpart screen 730 as shown in FIG. 7B at the center and another counterpart screen (e.g., 720) therearound.

According to an example embodiment, when the specific counterpart screen 730 is selected and output at the center as shown in FIG. 7B, and a user input 750 for a multimedia object on a multimedia object list 330 is received from a user, the processor 120 may output a 3D grid 430 having the second counterpart screen 730 at the center as described above with reference to FIG. 4A.

According to an example embodiment, as described above with reference to FIG. 5, the processor 120 may generate a snapping guide 760 to a nearby plane, and when a user input for a specific plane is received, position information of the corresponding plane and the multimedia object may be transmitted to a counterpart terminal.

Various example embodiments in which the counterpart terminal receiving the position information and the multimedia object outputs the multimedia object will be described in detail below with reference to FIGS. 8 to 9C.

<Example Electronic Device Receiving and Outputting a Multimedia Object>

Figure 8:
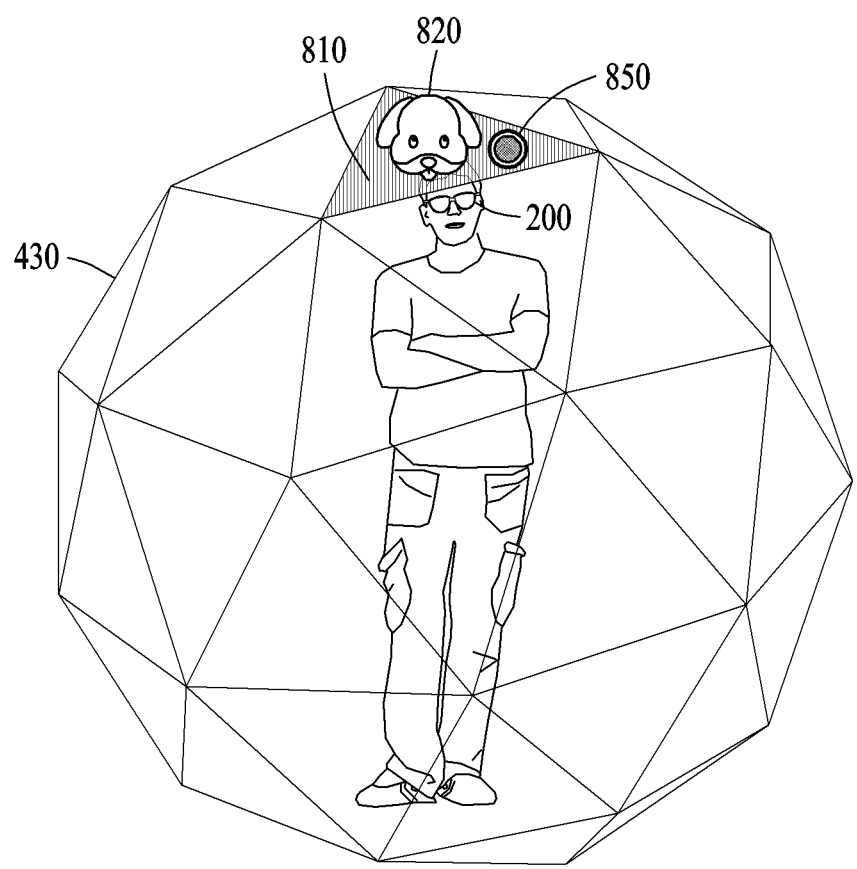
FIG. 8 is a diagram illustrating an operation of outputting a multimedia object in a wearable electronic device according to various example embodiments.

FIG. 8 is a diagram illustrating an operation of outputting a multimedia object in a wearable electronic device according to various example embodiments.

Referring to FIG. 8, when position information and a multimedia object are transmitted from the electronic device 300 as described above with reference to FIGS. 3 to 7B, the multimedia object may be output in the wearable electronic device 200 receiving the position information.

According to an example embodiment, the processor 120 of the wearable electronic device 200 may output the received multimedia object based on the received position information. As described above with reference to FIG. 5, the multimedia object may include a binaural sound, and the binaural sound converted based on the position information may be provided to a user wearing the wearable electronic device 200.

According to an example embodiment, as described above with reference to FIGS. 5 to 6C, distance information may be further received from a transmitting electronic device, and the processor 120 of a receiving electronic device may further apply the distance information to convert a binaural sound and output the converted binaural sound.

According to an example embodiment, of the multimedia object, a graphic object may be provided to the user of the wearable electronic device 200 based on position information of a selected plane according to a user input as described above with reference to FIG. 5. For example, referring to FIG. 8, when a 3D grid supported by the electronic device 300 transmitting the multimedia object and a 3D grid supported by the electronic device 200 receiving the multimedia object are the same as a 3D grid 430 of FIG. 8, and a plane selected by the electronic device 300 transmitting the multimedia object is a plane 810, the processor 120 of the wearable electronic device 200 may output a graphic object 820 on the same plane 810 corresponding thereto.

According to an example embodiment, the processor 120 of the receiving electronic device (e.g., the wearable electronic device 200 of FIG. 8) may change a position of the received multimedia object 820 according to a user input. For example, the processor 120 may output an object onto a plane on which the graphic object 820 is located after being dragged and dropped by the user.

According to an example embodiment, when detecting a user input 850 (e.g., double tap, gaze, etc.) for the graphic object 820 or the plane 810 onto which the graphic object 820 is output, the processor 120 of the wearable electronic device 200 may transmit position information of the plane 810 and the graphic object 820 to the transmitting electronic device 300.

As described above with reference to FIG. 4, the 3D grid 430 may have different shapes supported by each electronic device, and a 3D grid supported by the electronic device 300 transmitting the multimedia object and a 3D grid supported by the electronic device receiving the multimedia object may be different in shape. For example, when the wearable electronic device 200 receives the multimedia object and the position information as shown in FIG. 8, the shape of a 3D grid supported by the electronic device 300 transmitting the multimedia object and the shape of a 3D grid supported by the wearable electronic device 200 may be different.

According to an example embodiment, the processor 120 of the wearable electronic device 200 receiving the multimedia object may convert the received position information based on a supportable 3D grid shape and then output a graphic object at the converted position. For example, when a 3D grid supported by the transmitting electronic device 300 is a regular dodecahedron and a 3D grid supported by the receiving electronic device 200 is a regular hexahedron, a plane of the regular hexahedron corresponding to a plane selected from the regular dodecahedron may be determined for the regular hexahedron including the regular dodecahedron with the center of the 3D grid as the origin. However, this is provided only as an example, and examples are not limited thereto, and various 3D grid plane correspondence methods may be used. After determining the corresponding position, the processor 120 of the receiving electronic device 200 may output a graphic object at the corresponding position.

Although the wearable electronic device 200 of FIG. 8 provides a 360° display environment, the electronic device receiving the multimedia object (e.g., the electronic device 101 of FIG. 1 of a general type, such as, a smartphone or a tablet) may not support a stereoscopic or 3D display environment when it is a flat display electronic device, and thus position information may be converted by a method other than conversion between planes of a 3D grid. An example of the receiving electronic device as a flat display according to various example embodiments will be described below with reference to FIGS. 9A to 9C.

According to an example embodiment, in a receiving electronic device (e.g., the wearable electronic device 200 of FIG. 8), an output time at which a graphic object and a binaural sound included in a received multimedia object are output may differ for the graphic object and the binaural sound. According to an example embodiment, the graphic object may be output simultaneously at the reception by the receiving electronic device, and the binaural sound may be output together with the graphic object. According to another example embodiment, the processor 120 of the receiving electronic device may output the binaural sound when recognizing a user input (e.g., tap, gaze, etc.) for the graphic object.

According to an example embodiment, when the receiving electronic device is the wearable electronic device 200, the processor 120 of the receiving electronic device 200 may output the multimedia object at a position out of a field of view (FoV) of the user based on the received position information. In this case, for the binaural sound, the user may auditorily feel the sense of position. However, for the graphic object, the user may not recognize the output at the position out of the FoV, and the processor 120 may output a notification that the graphic object has been output at the position out of the FoV of the user.

Figure 9A:
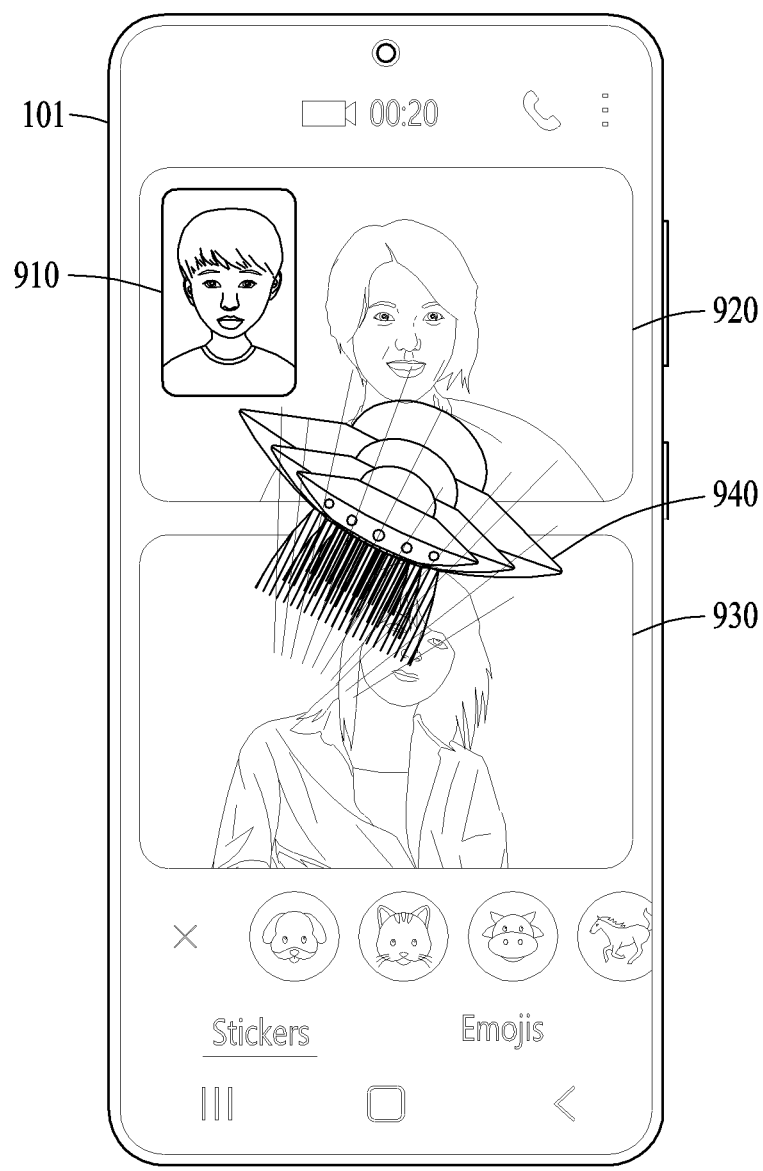
FIGS. 9A to 9C are diagrams illustrating an operation of outputting a multimedia object in an electronic device having a flat display according to various example embodiments.
Figure 9B:
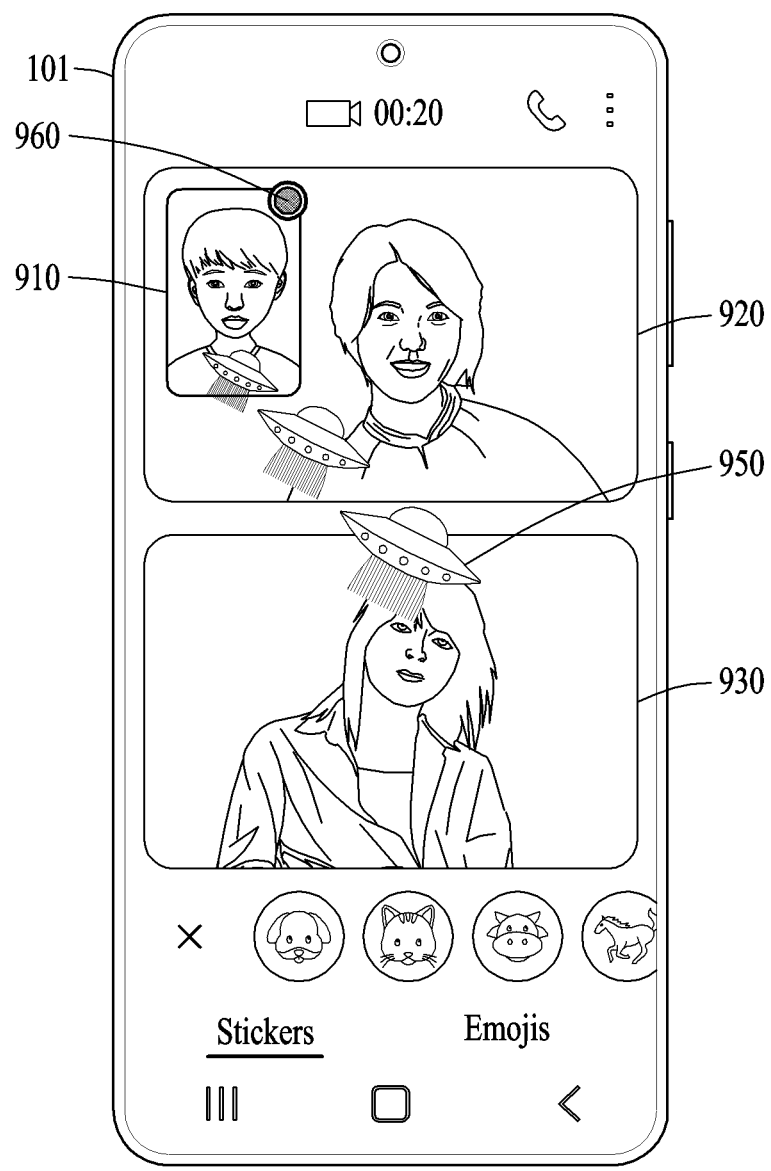
Figure 9C:
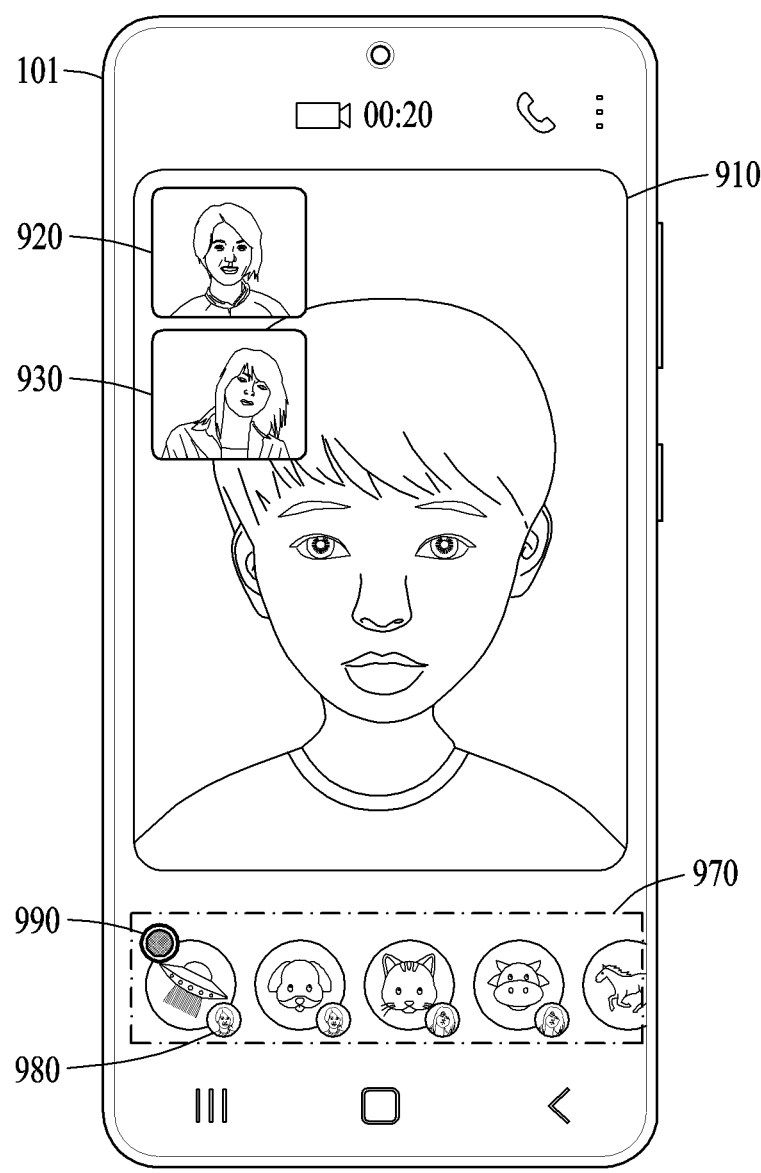

FIGS. 9A to 9C are diagrams illustrating an operation of outputting a multimedia object in an electronic device having a flat display according to various example embodiments.

The operation of outputting a multimedia object is described above with reference to FIG. 8, and the description thereof repeating what has been described above with reference to FIG. 8 will be omitted here.

An example embodiment of outputting a multimedia object when an electronic device receiving a multimedia object is a flat-display electronic device (e.g., a general type of electronic devices such as a smartphone or a tablet, for example, the electronic device 101 of FIG. 1) will be described hereinafter with reference to FIGS. 9A to 9C. As described above with reference to FIG. 8, the electronic device 101 having a flat display does not support a 3D display environment, and thus another method, instead of conversion between planes of a 3D grid, may be used to convert position information.

Referring to FIG. 9A, the processor 120 of the electronic device 101 may perform a video call with a plurality of counterpart terminals as described above with reference to FIG. 7A. Similar to what has been described above with reference to FIG. 7A, my screen 910, a first counterpart screen 920 of a first counterpart, and a second counterpart screen 930 of a third counterpart, which are captured by the electronic device 101 through the display module 160 of the electronic device 101 may be output in a PIP form.

According to an example embodiment, the processor 120 of the electronic device 101 may receive position information and a multimedia object from a counterpart terminal corresponding to the second counterpart screen 930. According to an example embodiment, the processor 120 may further receive information about a distance as described above with reference to FIGS. 5 to 6C.

According to an example embodiment, as described above with reference to FIG. 8, the multimedia object may include a graphic object and a binaural sound, and the binaural sound may be converted based on the position information and/or the distance information to be provided as a converted binaural sound to a user of the electronic device 101. However, for the graphic object, unlike in a case in which an electronic device receiving the multimedia object is the wearable electronic device 200, the electronic device 101 does not support a 360° display environment, and thus 3D-two-dimensional (2D) conversion, not 3D-3D conversion described above with reference to FIG. 8, may be performed.

According to an example embodiment, the processor 120 may receive the multimedia object and position information of a selected plane from a transmitting electronic device, and determine a corresponding position in a 2D grid obtained through the 3D-2D conversion. The processor 120 may determine the corresponding position and output the graphic object at the corresponding position in the 2D grid. For example, although FIG. 9A shows only a graphic object 940 that is finally output, the selected plane may be output such that its size increases gradually from the corresponding position that is converted to the 2D plane.

According to an example embodiment, as described above with reference to FIG. 8, there may be a difference in output time between the graphic object and the binaural sound. The graphic object may be output simultaneously at the reception, but the binaural sound may be output simultaneously or when a user input for the graphic object is detected.

According to an example embodiment, the receiving electronic device 101 may provide a screen shown in FIG. 9B after a screen shown in FIG. 9A is provided. Hereinafter, operation 950 of transmitting, to my screen 910, a multimedia object from a second counterpart screen 930 transmitting the multimedia object after returning to a basic video call screen will be described with reference to FIG. 9B. Through this, a user of the receiving electronic device 101 may intuitively recognize that a counterpart who has transmitted the multimedia object immediately previously is a user corresponding to the second counterpart screen 930.

According to an example embodiment, when receiving a user input 960 (e.g., touch, tap, etc.) for a screen 910 captured by the electronic device 101, the processor 120 of the receiving electronic device 101 may provide a screen as shown in FIG. 9C. Referring to FIG. 9C, my screen 910 may be provided in a great size at the center, and the first counterpart screen 920 and the second counterpart screen 930 performing a video call may be provided in a small size on the periphery. The processor 120 may display a multimedia object list 970 received by the electronic device 101 and information 980 about a counterpart terminal that has transmitted each multimedia object. According to an example embodiment, when receiving a user input 990 (e.g., double tap) for a specific multimedia object on the received multimedia object list 970, the processor 120 may transmit the same multimedia object to the corresponding counterpart terminal as described above with reference to FIG. 8.

<Example Method of Transmitting a Multimedia Object>

Figure 10:
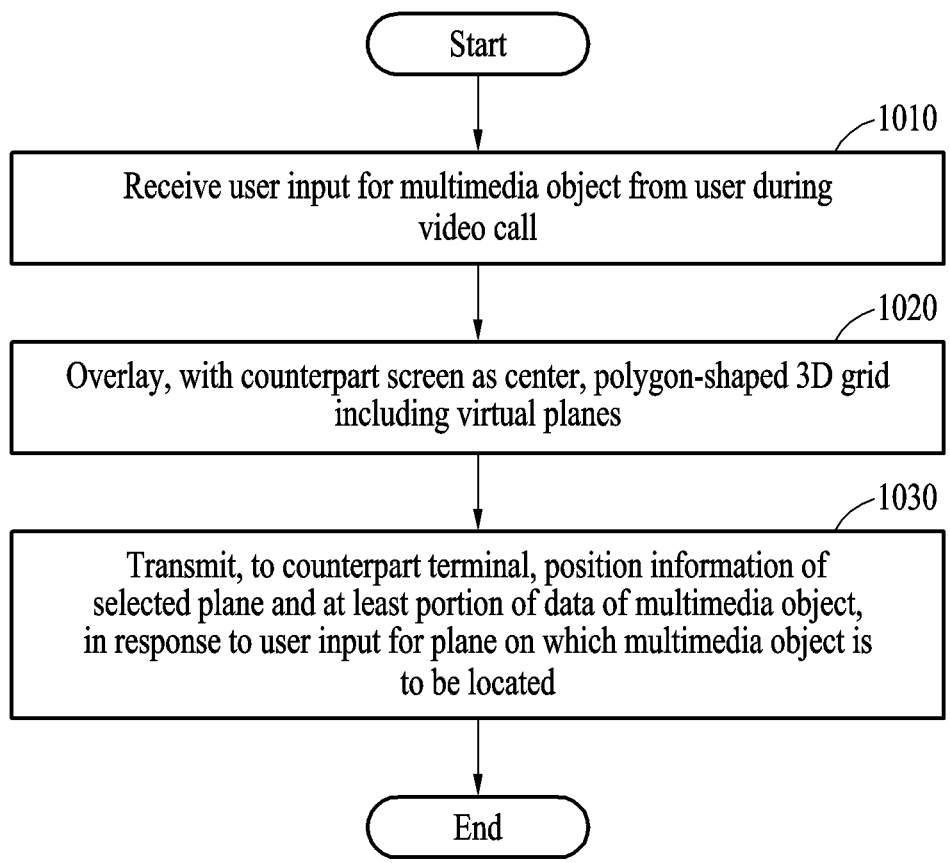
FIG. 10 is a flowchart illustrating an operation of an electronic device transmitting a multimedia object based on a position according to various example embodiments.

FIG. 10 is a flowchart illustrating an operation of an electronic device transmitting a multimedia object based on a position according to various example embodiments.

Operations 1010 to 1030 may be performed by the processor 120 of the electronic device 300 described above with reference to FIG. 3. An electronic device transmitting a multimedia object and position information is described above with reference to FIGS. 3 to 7B, and a repeated description thereof will be omitted.

According to an example embodiment, in operation 1010, the processor 120 may receive a user input for a multimedia object from a user while performing a video call. As described above with reference to FIGS. 4A and 4B, a user input 410 for a specific multimedia object among multimedia objects 330 may be received, and in operation 1020, the processor 120 may overlay a polygon-shaped 3D grid 430 including a plurality of virtual planes, with a counterpart screen 310 of a counterpart at the center.

According to an example embodiment, as described above with reference to FIG. 4B, the 3D grid 430 may be generated, having, as the center, a 3D mesh 450 modeled in a human shape rather than the counterpart screen 310.

According to an example embodiment, in operation 1030, the processor 120 may transmit position information of a selected plane and at least a portion of data on the multimedia object to a counterpart terminal in response to a user input to a plane on which the multimedia object is to be located. As described above with reference to FIG. 5, the processor 120 may determine a position to which the multimedia object is to be transmitted based on the user input, and determine the position information, for example, information about coordinates corresponding to vertices of the selected plane on a coordinate system whose origin is the center of the counterpart screen or index information of the planes of the 3D grid. The processor 120 may transmit the position information and the information about the multimedia object to the counterpart terminal. As described above with reference to FIG. 5, in operation 1030, the processor 120 may further transmit distance information to the counterpart terminal.

According to an example embodiment, as described above with reference to FIGS. 6A and 6B, a 3D grid may be available to convert and resize. According to an example embodiment, as described above with reference to FIGS. 7A and 7B, the processor 120 may transmit a multimedia object and position information to a specific counterpart terminal even when a video call is being performed with a plurality of counterpart terminals.

<Example Method of Outputting a Multimedia Object>

Figure 11:
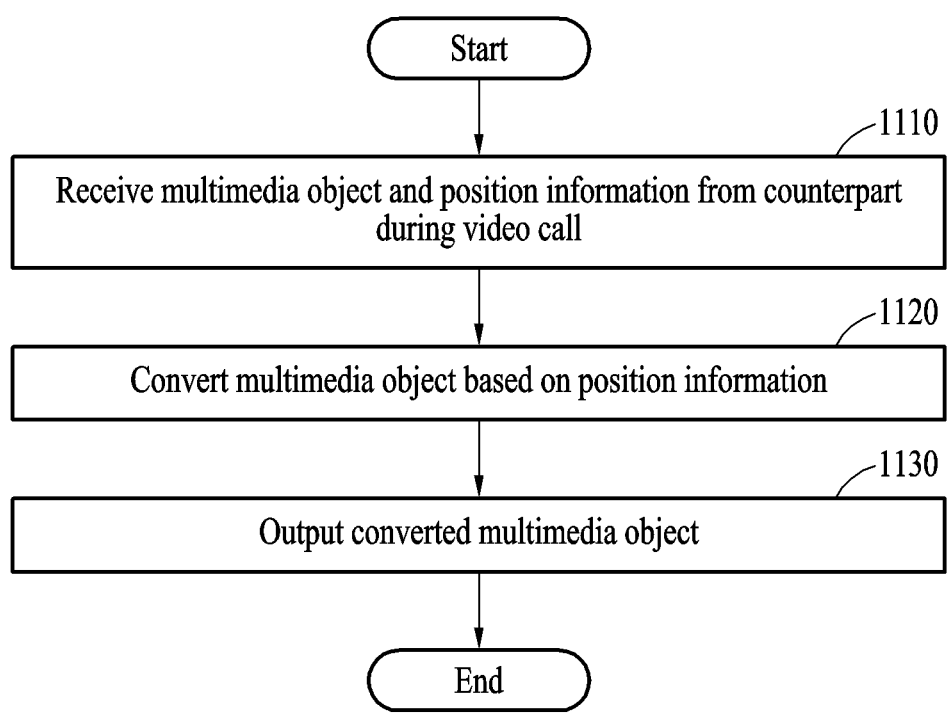
FIG. 11 is a flowchart illustrating an operation of an electronic device receiving a multimedia object based on a position according to various example embodiments.

FIG. 11 is a flowchart illustrating an operation of an electronic device receiving a multimedia object based on a position according to various example embodiments.

Operations 1110 to 1130 may be performed by the processor 120 of the electronic device 101 described above with reference to FIG. 1 or the wearable electronic device 200. An electronic device receiving and outputting a multimedia object and position information is described above with reference to FIGS. 8 to 9C, and a repeated description thereof will be omitted.

According to an example embodiment, in operation 1110, the processor 120 of the receiving electronic device may receive a multimedia object and position information while performing a video call. The receiving electronic device may be the electronic device 101 of FIG. 1 having a flat display or the wearable electronic device 200 of FIG. 2 having a 360° display environment.

As described above with reference to FIG. 8, different forms of a 3D grid may be supported by a transmitting electronic device and a receiving electronic device, and when the receiving electronic device has a flat display, it may not support the 3D grid. Accordingly, the processor 120 of the receiving electronic device may convert the multimedia object based on the position information in operation 1120. An operation of converting multimedia according to various example embodiments will be described in detail below with reference to FIG. 12.

According to an example embodiment, in operation 1130, the processor 120 of the receiving electronic device may output the converted multimedia object. As described above with reference to FIGS. 8 to 9C, a binaural sound and a graphic object may be output, and output times thereof may be different. For example, the graphic object and the sound may be simultaneously output, or the graphic object may be output and the sound may then be output when a user input for the graphic object is received.

Figure 12:
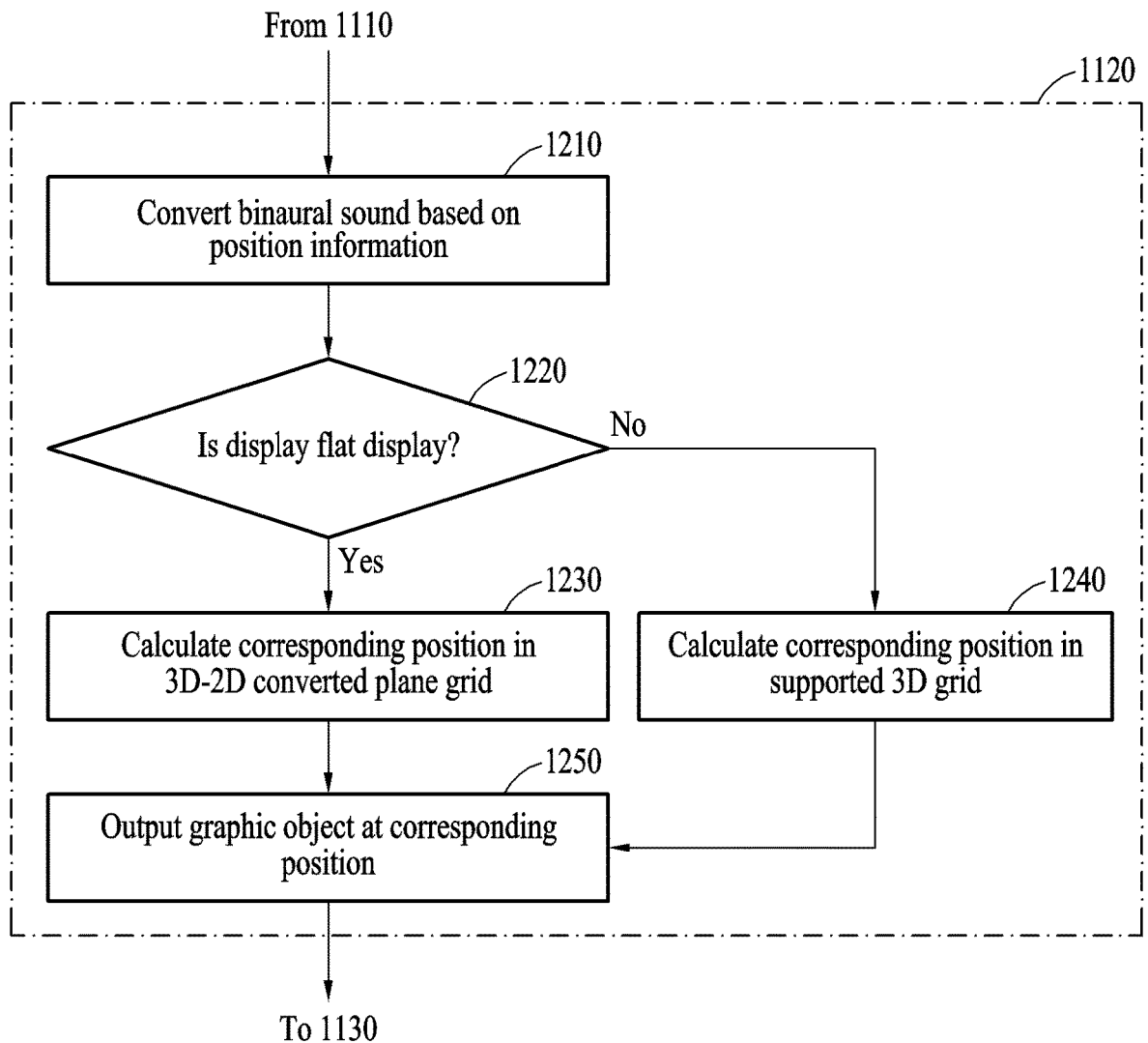
FIG. 12 is a flowchart illustrating an operation of converting a multimedia object based on position information according to various example embodiments.

FIG. 12 is a flowchart illustrating an operation of converting a multimedia object based on position information according to various example embodiments.

Operations 1210 to 1250 may be performed by the processor 120 of the electronic device 101 described above with reference to FIG. 3 or the wearable electronic device 200. According to an example embodiment, operations 1210 to 1250 may correspond to an operation (e.g., operation 1120 of FIG. 11) of converting a multimedia object based on position information described above with reference to FIG. 11.

According to an example embodiment, in operation 1210, the processor 120 of the receiving electronic device may convert a binaural sound based on received position information. As described above with reference to FIGS. 8 to 9C, the sound may be converted based on the received position information regardless of whether a display of the receiving electronic device is a flat display or supports a 360° display environment.

According to an example embodiment, as described above with reference to FIGS. 8 to 9C, the processor 120 of the receiving electronic device may further receive distance information, and the binaural sound may be converted as the distance information is further applied.

According to an example embodiment, operation 1220 may be performed differently based on whether the display is a flat display in the case of a graphic object of a multimedia object.

According to an example embodiment, in a case in which the receiving electronic device is a wearable electronic device supporting a 360° display environment, as in the wearable electronic device 200 of FIG. 2, the processor 120 may calculate a corresponding position in operation 1240. As described above with reference to FIG. 8, the transmitting electronic device and the receiving electronic device may support different forms of a 3D grid, and thus the corresponding position may be calculated through a conversion process between 3D grids.

According to an example embodiment, when the receiving electronic device is a flat display as in the electronic device 101 of FIG. 1, the processor 120 may calculate the corresponding position in operation 1230. As described above with reference to FIGS. 9A to 9C, the processor 120 may calculate the corresponding position in a 3D-2D converted plane grid.

According to an example embodiment, after the corresponding position is determined, the processor 120 may output the graphic object at the corresponding position in operation 1250. According to an example embodiment, after the graphic object and the binaural sound are converted, the processor 120 may output the converted multimedia object as described above about operation 1130.

According to an example embodiment, an electronic device 300 transmitting a multimedia object may include: a display module 160 that displays a screen and receives a user input; a memory 130 that stores computer-executable instructions; and a processor 120 that accesses the memory 130 and executes the instructions. According to an example embodiment, the instructions may be configured to: when a user input 410 for a multimedia object is received through the display module 160 during a video call, overlay a polygon-shaped 3D grid 430 including a plurality of virtual planes, with a counterpart screen 310 displayed on the screen being at a center. According to an example embodiment, the instructions may be configured to: transmit position information of a selected plane and at least a portion of data on the multimedia object to a counterpart terminal in response to a user input on a plane 510 on which the multimedia object is to be located.

According to an example embodiment, when the counterpart terminal is AR glasses (e.g., the wearable electronic device 200 of FIG. 8), the counterpart terminal may determine a position 810 corresponding to a selected plane in a 3D grid supported by the counterpart terminal, and output a multimedia object 820 at the corresponding position.

According to an example embodiment, when the display of the counterpart terminal is a flat display, the counterpart terminal (e.g., the electronic device 101 of FIG. 9A) may determine a position corresponding to a selected plane in a plane grid obtained by converting the 3D grid to a 2D grid, and output the multimedia object at the determined position.

According to an example embodiment, the instructions stored in the memory 130 may be configured to: output a color of the selected plane 510 among a plurality of planes differently from those of other planes.

According to an example embodiment, the selected plane 510 among the plurality of planes may be selected by one of a drag and drop, a tap, or a touch on the plane 510 of the multimedia object.

According to an example embodiment, the instructions stored in the memory 130 may be further configured to: when a video call is performed with a plurality of counterpart terminals, select a target terminal to which the multimedia object is to be transmitted from among the plurality of counterpart terminals, based on a user input 740.

According to an example embodiment, when receiving a user input (e.g., 850 or 990) for a received multimedia object, the counterpart terminal may transmit position information and the multimedia object to the electronic device.

According to an example embodiment, when the position information of the selected plane 510 is out of an FoV of the counterpart, the counterpart terminal may output a notification that the multimedia object has been output at a position out of the FoV.

According to an example embodiment, the 3D grid 430 may be any one of a regular hexahedron, a regular octahedron, a regular dodecahedron, and a regular icosahedron.

According to an example embodiment, the 3D grid 430 may be rotated and resized based on a user input 610.

According to an example embodiment, the multimedia object may include a binaural sound, and the sound may be converted based on the position information about the selected plane 510.

According to an example embodiment, an operating method of an electronic device 300 may include: when a user input 410 for a multimedia object (e.g., a graphic object) is received during a video call, overlaying a polygon-shaped 3D grid 430 including a plurality of virtual planes, based on a counterpart screen 310 displayed on a screen of the electronic device 300 being at a center; and transmitting position information of a selected plane 510 and at least a portion of data on the multimedia object to a counterpart terminal in response to a user input on the plane 510 on which the multimedia object is to be located among the plurality of planes.

According to an example embodiment, when the counterpart terminal is AR glasses (e.g., the wearable electronic device 200 of FIG. 8), the counterpart terminal may determine a position 810 corresponding to the selected plane 510 in a 3D grid supported by the counterpart terminal, and output the multimedia object at the corresponding position.

According to an example embodiment, when a display of the counterpart terminal is a flat display, the counterpart terminal (e.g., the electronic device 101 of FIGS. 9A to 9C) may determine a position corresponding to the plane 510 selected from a plane grid obtained by converting the 3D grid to a 2D grid, and output the multimedia object at the corresponding position.

According to an example embodiment, when a video call is performed with a plurality of counterpart terminals, the operating method may further include: selecting a target terminal to which the multimedia object is to be transmitted from among the plurality of counterpart terminals based on a user input 740.

According to an example embodiment, when the position information of the selected plane is out of an FoV of the counterpart, the counterpart terminal may output a notification that the multimedia object has been output at a position that is out of the FoV.

According to an example embodiment, the 3D grid 430 may be rotated and resized based on a user input 610.

According to an example embodiment, the multimedia object may include a binaural sound, and the sound may be converted based on the position information about the selected plane 510.

According to an example embodiment, a non-transitory computer-readable recording medium in which a program 140 for controlling operations of an electronic device 300 is recorded may include the program 140 configured to cause the electronic device 300 to: when receiving a user input 410 for a multimedia object (e.g., a graphic object) while performing a video call, overlay a polygon-shaped 3D grid 430 including a plurality of virtual planes, based on a counterpart screen 310 of a counterpart displayed on a screen of the electronic device 300, being at a center; and transmit, to a counterpart terminal of the counterpart, position information of a selected plane 510 and at least a portion of data on the multimedia object, in response to a user input on a plane on which the multimedia object is to be located among the plurality of planes.

According to an example embodiment, the multimedia object may include a binaural sound, and the sound may be converted based on the position information about the selected plane 510.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device, comprising:
a display module, comprising a display, configured to display a screen and receive a user input;
memory configured to store computer-executable instructions; and
at least one processor comprising processing circuitry,
wherein the instructions, when executed by the at least one processor individually and/or collectively, cause the electronic device to:
display, on the screen, a counterpart screen of a counterpart during a video call with a counterpart terminal of the counterpart;
visually overlay a polygon-shaped three-dimensional (3D) grid comprising a plurality of virtual planes on the counterpart screen and at least partially surrounding the counterpart screen such that the counterpart screen is at least partially within the polygon-shaped 3D grid, based on a user input for a multimedia object received via the display module during the video call; and
in response to a user input for selecting a plane on which the multimedia object is to be located among the plurality of planes of the polygon-shaped 3D grid, control to transmit, to the counterpart terminal of the counterpart, position information of the selected plane and at least a portion of data on the multimedia object.

2. The electronic device of claim 1, wherein the instructions, when executed by the at least one processor individually and/or collectively, cause the electronic device to, in response to the counterpart terminal being augmented reality (AR) glasses:
determine a position corresponding to the selected plane in the 3D grid supported by the counterpart terminal; and
output the multimedia object at the position.

3. The electronic device of claim 1, wherein the instructions, when executed by the at least one processor individually and/or collectively, cause the electronic device to, in response to a display of the counterpart terminal being a flat display:
determine a position corresponding to the selected plane in a plane grid obtained by converting the 3D grid to a two-dimensional (2D) grid; and
output the multimedia object at the position.

4. The electronic device of claim 1, wherein the instructions, when executed by the at least one processor individually and/or collectively, cause the electronic device to:
output a color of the selected plane of the plurality of planes differently from those of other planes,
wherein the plane is selected from among the plurality of planes via at least one of: drag-and-drop, tap, or touch, on the plane of the multimedia object.

5. The electronic device of claim 1, wherein the instructions, when executed by the at least one processor individually and/or collectively, cause the electronic device to:
in response to a video call being performed with a plurality of counterpart terminals, select a target terminal to which the multimedia object is to be transmitted from among the plurality of counterpart terminals, based on a user input.

6. The electronic device of claim 1, wherein, when the user input for the multimedia object is received, the counterpart terminal is configured to transmit the position information and the multimedia object to the electronic device; or
when the position information of the selected plane is out of a field of view (FoV) of the counterpart, the counterpart terminal is configured to output a notification that the multimedia object has been output at a position out of the FoV.

7. The electronic device of claim 1, wherein the multimedia object comprises at least one of: information about a graphic object, information about a sound, or information about American Standard Code for Information Interchange (ASCII) codes, and
a rotation and a size of the 3D grid is adjustable based on a user input.

8. The electronic device of claim 1, wherein the counterpart terminal is configured to provide a binaural sound that is converted based on the position information of the selected plane.

9. An operating method of an electronic device, the method comprising:
displaying, on a screen, a counterpart screen of a counterpart during a video call with a counterpart terminal of the counterpart;
visually overlaying a polygon-shaped three-dimensional (3D) grid comprising a plurality of virtual planes on the counterpart screen and at least partially surrounding the counterpart screen such that the counterpart screen is at least partially within the polygon-shaped 3D grid, based on receiving a user input for a multimedia object and/or a graphic object during a video call; and in response to a user input for selecting a plane on which the multimedia object and/or a graphic object is to be located among the plurality of planes of the polygon-shaped 3D grid, transmitting, to the counterpart terminal of the counterpart, position information of the selected plane and at least a portion of data on the multimedia object.

10. The operating method of claim 9, wherein, in response to the counterpart terminal being augmented reality (AR) glasses, the counterpart terminal:

determines a position corresponding to the selected plane in the 3D grid supported by the counterpart terminal; and outputs the multimedia object at the position.

11. The operating method of claim 9, wherein, in response to a display of the counterpart terminal being a flat display, the counterpart terminal:

determines a position corresponding to the selected plane in a plane grid obtained by converting the 3D grid to a two-dimensional (2D) grid; and outputs the multimedia object at the position.

12. The operating method of claim 9, wherein, in response to a voice call being performed with a plurality of counterpart terminals, the method further comprising:

selecting a target terminal to which the multimedia object is to be transmitted from among the plurality of counterpart terminals, based on a user input.

13. The operating method of claim 9, wherein in response to the position information of the selected plane being out of a field of view (FoV) of the counterpart, the counterpart terminal:

outputs a notification that the multimedia object has been output at a position out of the FoV.

14. The method of claim 9, wherein a rotation and a size of the 3D grid is adjustable based on a user input.

15. The method of claim 9, wherein the counterpart terminal provides a binaural sound that is converted based on the position information of the selected plane.

16. A system comprising an electronic device and at least one counterpart terminal, the system comprising:

the electronic device comprising a display configured to display a screen and receive a user input, memory storing computer-executable instructions and at least one processor comprising processing circuitry, wherein the instructions, when executed by the at least one processor individually and/or collectively, cause the electronic device configured to:

display, on the screen, a counterpart screen of a counterpart during a video call with a counterpart terminal of the counterpart;

visually overlay a polygon-shaped three-dimensional (3D) grid comprising a plurality of virtual planes on the counterpart screen and at least partially surrounding the counterpart screen such that the counterpart screen is at least partially within the polygon-shaped 3D grid, based on a user input for a multimedia object received via the display during the video call; and in response to a user input for selecting a plane on which the multimedia object is to be located among the plurality of planes of the polygon-shaped 3D grid, control to transmit, to the counterpart terminal related to the counterpart, position information of the selected plane and at least a portion of data on the multimedia object.

17. The system of claim 16, wherein the instructions, when executed by the at least one processor individually and/or collectively, cause the electronic device to, in response to the counterpart terminal comprising augmented reality (AR) glasses:

determine a position corresponding to the selected plane in the 3D grid supported by the counterpart terminal; and output the multimedia object at the position.

18. The system of claim 16, wherein the instructions, when executed by the at least one processor individually and/or collectively, cause the electronic device to, in response to a display of the counterpart terminal being a flat display:

determine a position corresponding to the selected plane in a plane grid obtained by converting the 3D grid to a two-dimensional (2D) grid; and output the multimedia object at the position.

* * * * *